United States Patent
Hinderling et al.

(10) Patent No.: US 9,752,863 B2
(45) Date of Patent: Sep. 5, 2017

(54) CALIBRATION METHOD FOR A DEVICE HAVING A SCAN FUNCTION

(75) Inventors: Juerg Hinderling, Marbach (CH); Bianca Gordon, Weissensberg (DE); Bernd Walser, Heerbrugg (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 333 days.

(21) Appl. No.: 14/006,096

(22) PCT Filed: May 10, 2012

(86) PCT No.: PCT/EP2012/058656
§ 371 (c)(1),
(2), (4) Date: Sep. 18, 2013

(87) PCT Pub. No.: WO2012/156277
PCT Pub. Date: Nov. 22, 2012

(65) Prior Publication Data
US 2014/0009604 A1    Jan. 9, 2014

(30) Foreign Application Priority Data
May 13, 2011   (EP) .................................... 11165971

(51) Int. Cl.
*H04N 7/18*   (2006.01)
*G01B 11/00*   (2006.01)
(Continued)

(52) U.S. Cl.
CPC .......... *G01B 11/002* (2013.01); *G01C 15/002* (2013.01); *G01S 7/4972* (2013.01); *G01S 17/023* (2013.01); *G01S 17/42* (2013.01)

(58) Field of Classification Search
None
See application file for complete search history.

(56) References Cited

U.S. PATENT DOCUMENTS 7,623,224 B2 * 11/2009 Vogel ...................... G01C 1/04
356/141.5
7,733,544 B2   6/2010 Becker et al.
(Continued)

FOREIGN PATENT DOCUMENTS

CN    101762809 A    6/2010
DE    20 2006 005643    7/2006

OTHER PUBLICATIONS

European Search Report mailed Nov. 2, 2011 in European Patent Application No. EP 11165971.

*Primary Examiner* — James M Anderson, II
(74) *Attorney, Agent, or Firm* — Maschoff Brennan

(57) ABSTRACT

A device having a scan function comprising an electro-optical distance measuring element having a laser axis as the target axis, a motorized optical deflection unit, which deflects the target axis by a deflection angle, and an angle measuring element for determining at least one angular position of the deflection unit. First measurement of angle coordinates of a reticle in a first angular position of the deflection unit as the first position, and second measurement of angle coordinates of the reticle in a second angular position of the deflection unit as the second position. The first and second measurements of the reticle are carried out on the basis of images taken with a camera, the optical axis of which is deflected by the deflection unit, and calibration parameters are determined on the basis of the angular positions and the angular coordinates in the first and second positions.

21 Claims, 11 Drawing Sheets

(51) Int. Cl.
  *G01C 15/00*   (2006.01)
  *G01S 7/497*   (2006.01)
  *G01S 17/02*   (2006.01)
  *G01S 17/42*   (2006.01)

(56) References Cited

U.S. PATENT DOCUMENTS

| | | | |
|---|---|---|---|
| 2004/0208340 A1* | 10/2004 | Kirschner | F41G 3/145 |
| | | | 382/103 |
| 2009/0147319 A1 | 6/2009 | Becker et al. | |
| 2010/0134596 A1 | 6/2010 | Becker | |
| 2010/0172546 A1* | 7/2010 | Sharp | G01B 11/26 |
| | | | 382/106 |
| 2011/0023578 A1* | 2/2011 | Grasser | G01C 25/00 |
| | | | 73/1.75 |
| 2012/0176594 A1 | 7/2012 | Qiao | |
| 2012/0188559 A1* | 7/2012 | Becker | G01C 15/002 |
| | | | 356/612 |

* cited by examiner

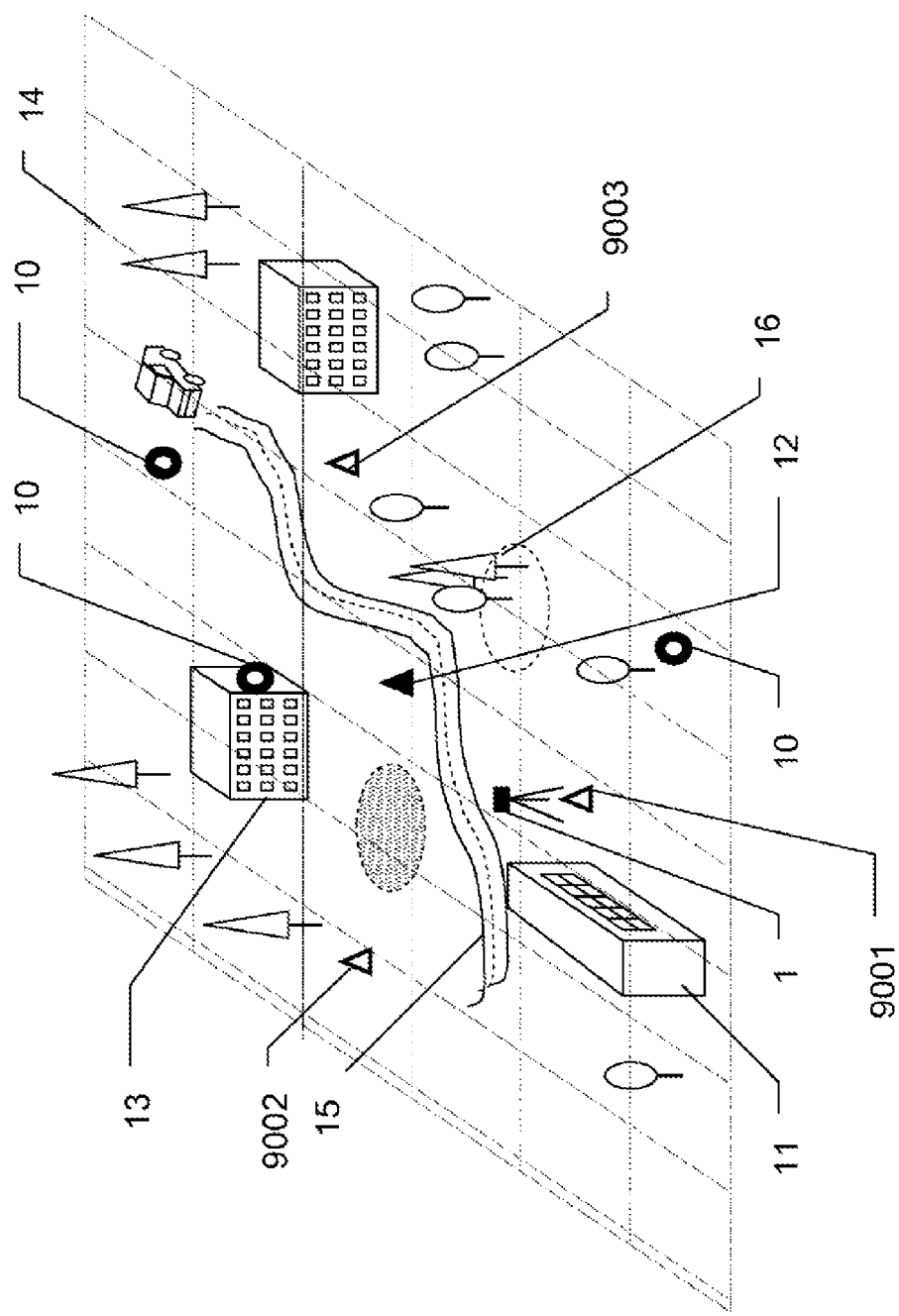

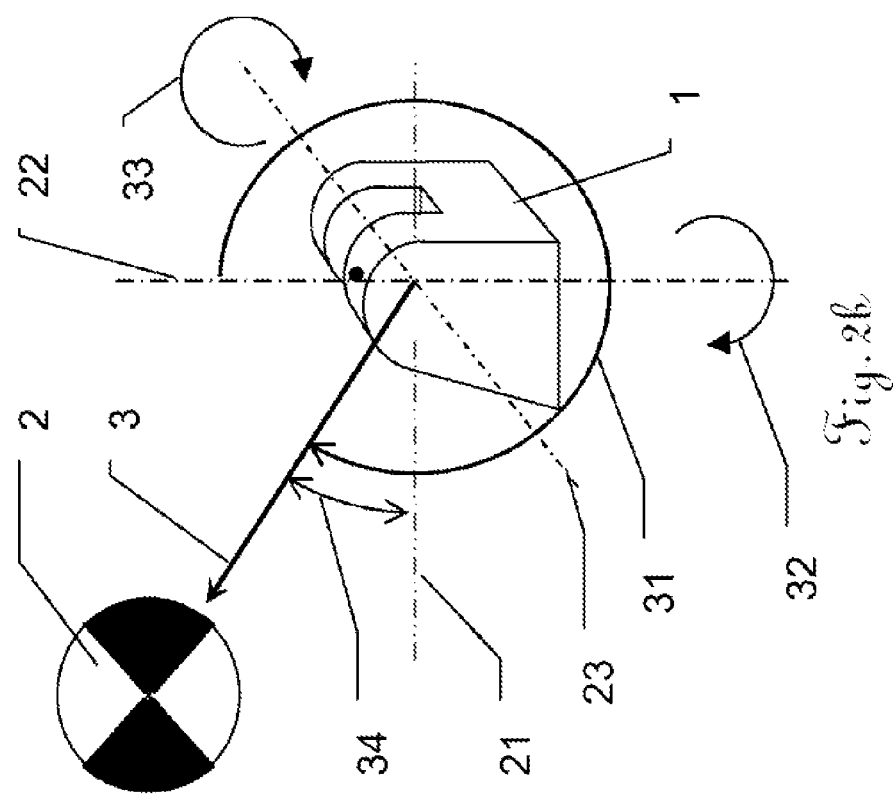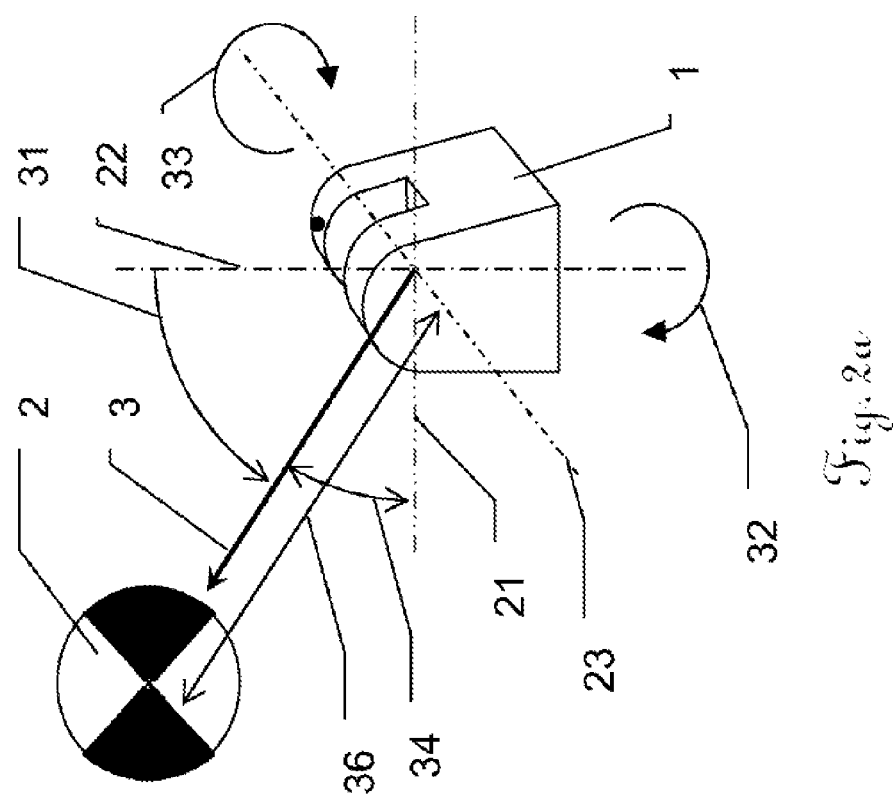

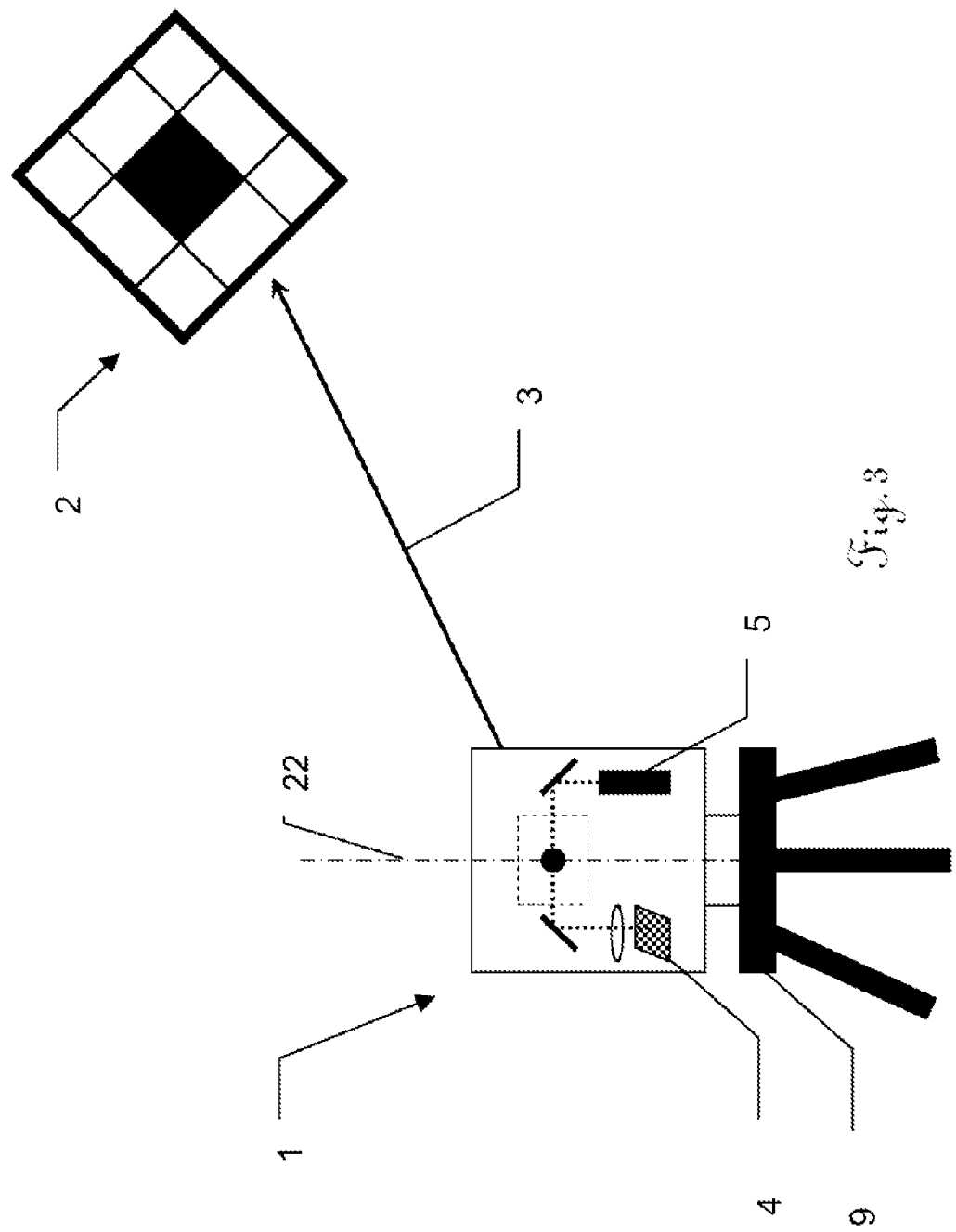

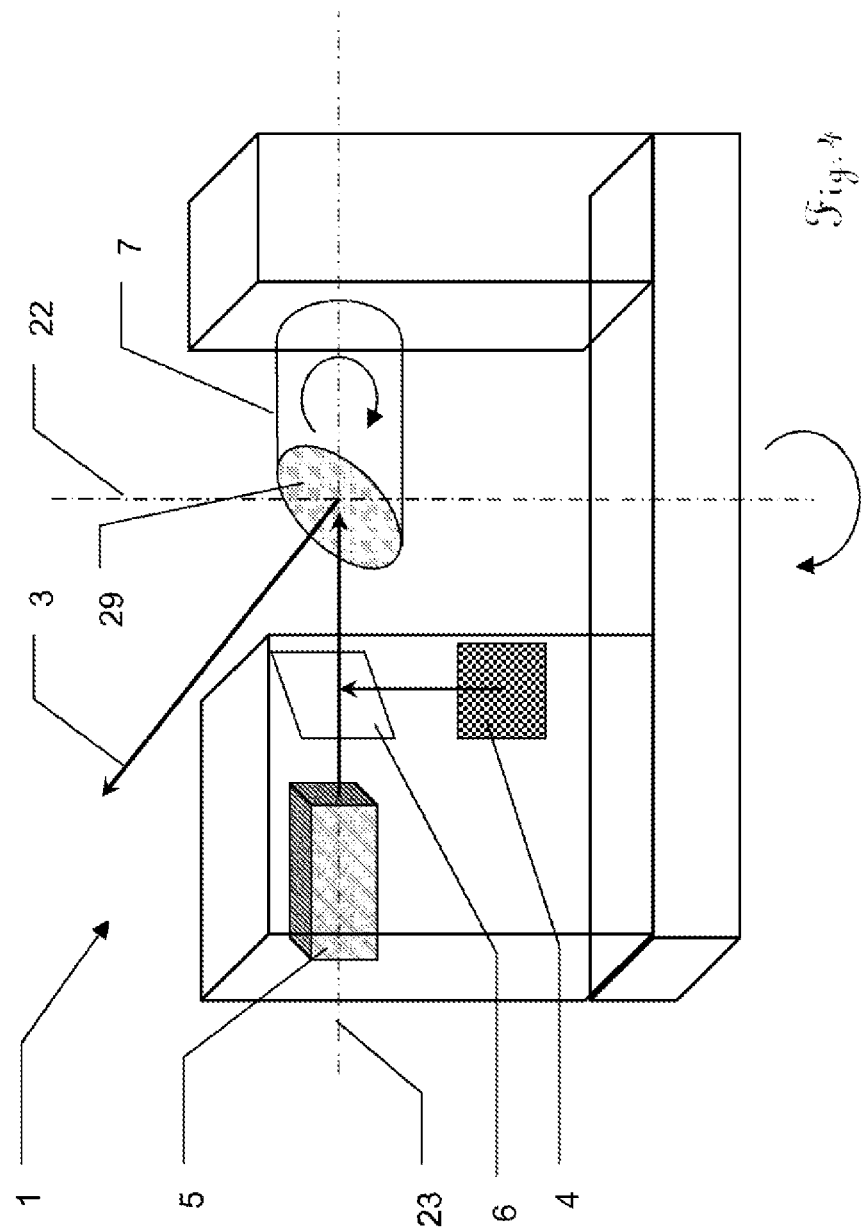

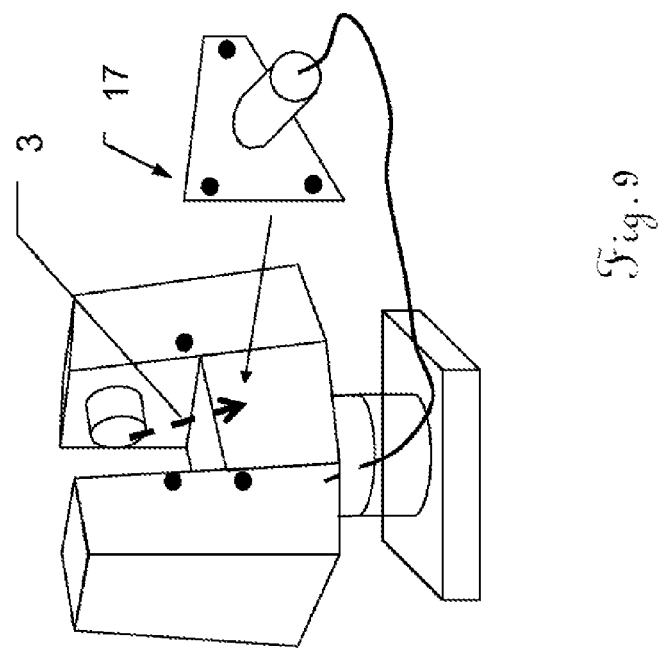
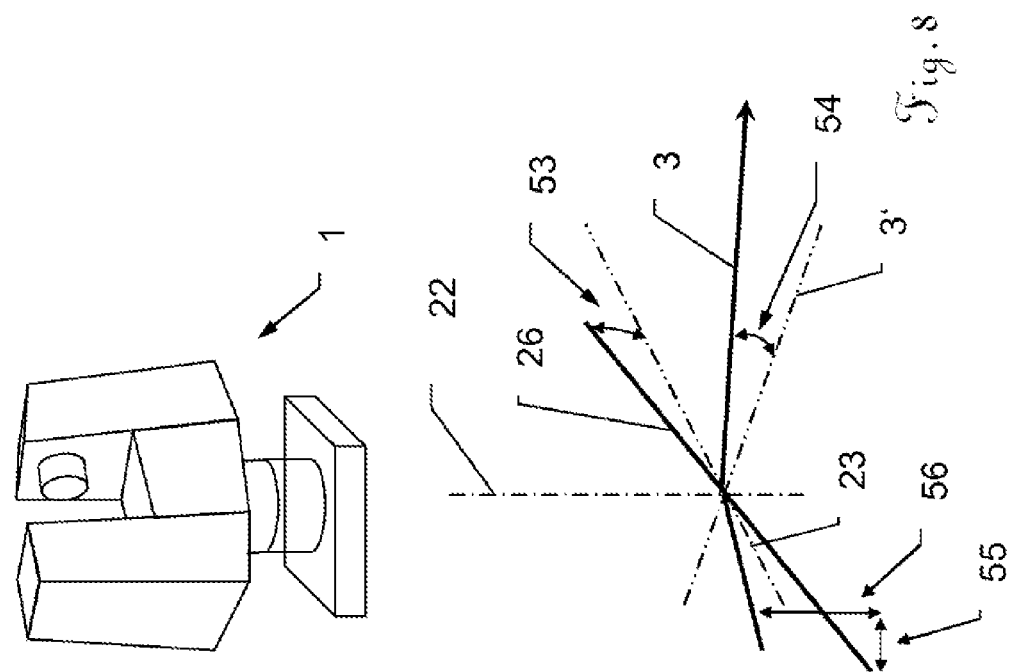

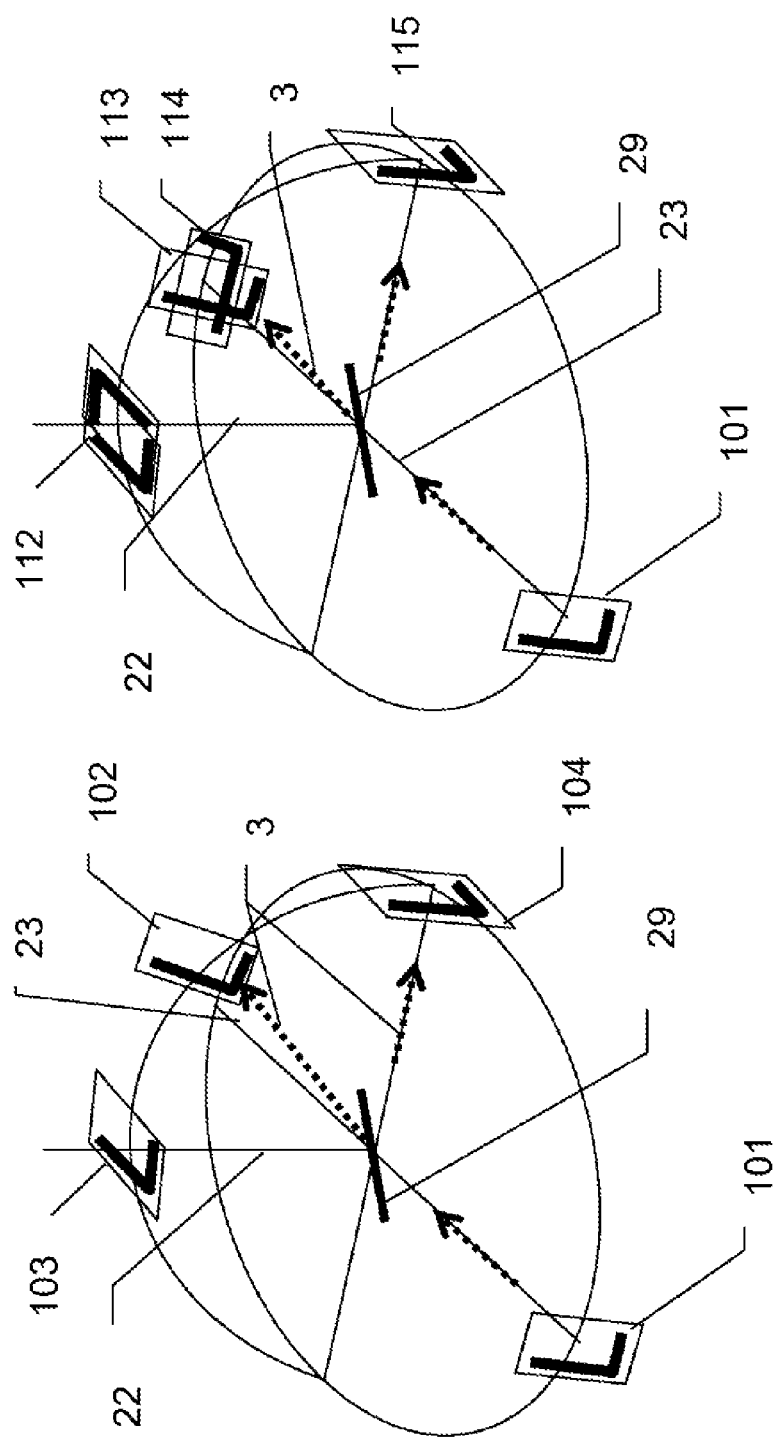

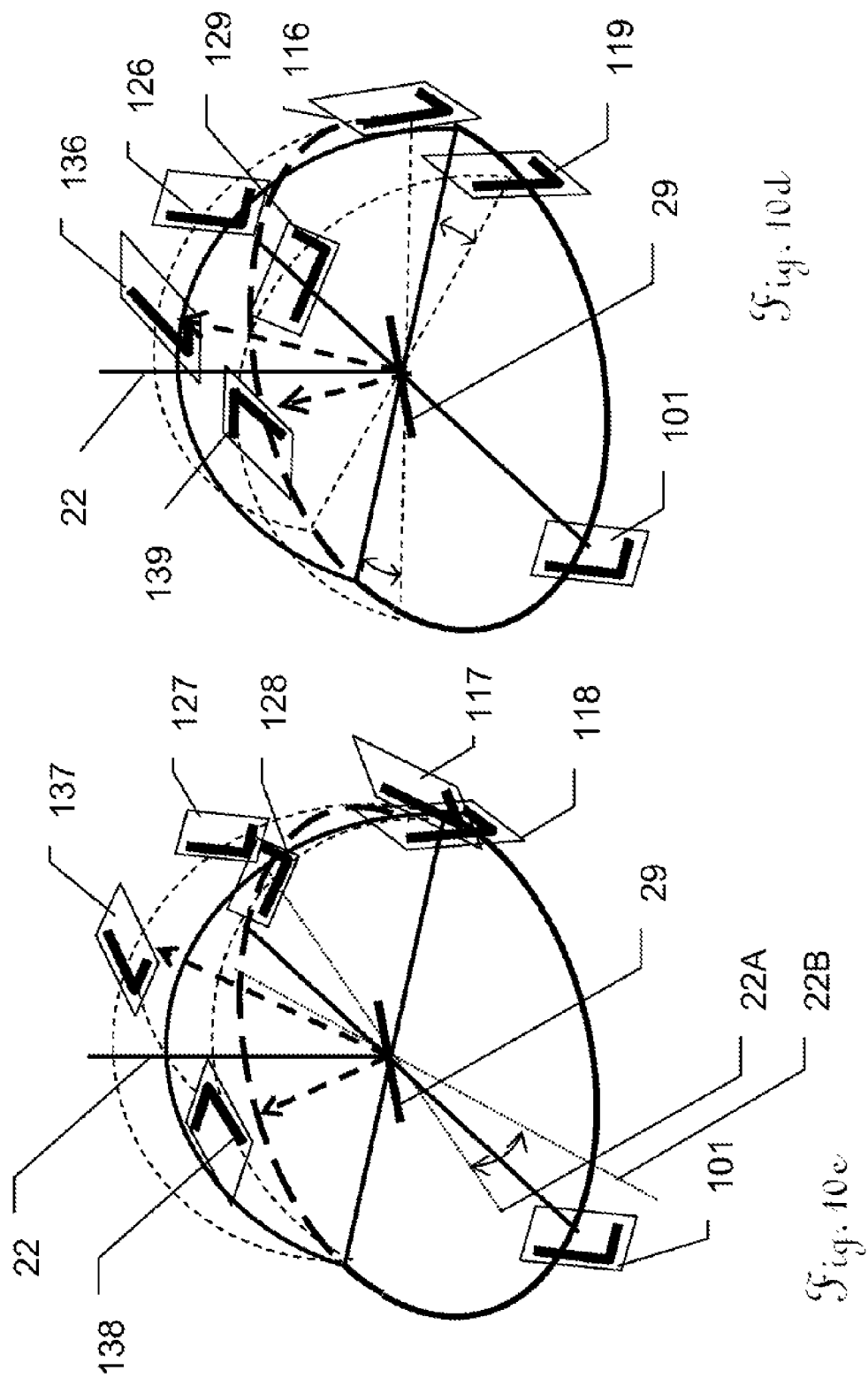

CALIBRATION METHOD FOR A DEVICE HAVING A SCAN FUNCTION

FIELD OF THE INVENTION

The invention relates to a field calibration method for a device having a scan function for spatially surveying objects, and to a device having a scan function.

BACKGROUND 3D scanning is a very effective technology for producing millions of spatial measurement points of objects within minutes or seconds. Increasingly, terrestrial 3D scanners are also used for classical surveying tasks and projects. At the moment, however, said scanners still have a few deficiencies or disadvantages, such as for example a field workflow that is atypical for geodetic surveying, insufficient measurement accuracy or the need for subsequent data processing in the office to prepare the desired measurement results.

Established manufacturers of laser scanners are currently working on matching the workflow management of 3D scanners to the needs of classical surveying. A first step here is to reduce the size of the scanner apparatuses and to improve their robustness so as to allow their field use in rough environments such as for example on construction sites. Portability and a flexible and quick setup of the measurement devices are essential requirements in surveying applications. Examples of such scanner apparatuses are the TRIMBLE GX 3D, Faro Photon 120 or ScanStation C10 by Leica Geosystems, such as is described for example in DE 20 2006 005643 U1 or US 2009/147319.

For classical surveying tasks such as for example recording buildings or civil engineering structures, the measurement accuracy of such prior art scanners is frequently too low. In particular in the case of steel structures, high point accuracy is unavoidable since the structural elements used in this case usually require narrow measurement tolerances. Attempts have therefore been made to achieve higher measurement accuracy with each development generation of such scanner apparatuses, not least to be in a position to cover new markets and further surveying tasks.

Examples of recent scanner applications are:
- monitoring existing buildings with respect to changes in shape, subsidence, tilting etc;
- monitoring the construction progress on construction sites and monitoring the dimensional accuracy of the work that has been carried out;
- support during setup and alignment of various components on construction sites, such as for example columns, pipelines, openings, windows, doors, ready-mixed concrete parts etc.;
- inventories of existing buildings for map representation or 3D modeling, for example when planning reconstructions or extensions;
- forensic/criminal-technical applications, for example for digitally reconstructing events at incidence scenes or accident sites;
- classical surveying tasks such as land surveys, spatial planning, marking of buildings, checking zoning regulations etc.;
- historical restoration.

In terms of basic construction, such scanners are configured to acquire, using a distance measuring unit, usually an electro-optical and laser-based distance measuring unit, a distance from a measurement point. A direction-deflection unit, which is likewise present, is configured here such that the measurement beam from the distance measuring unit is deflected in at least two spatial directions, as a result of which a spatial measurement region can be captured. The deflection unit can be realized in the form of a moving mirror or alternatively also by other elements suitable for controlled angular deflection of optical radiation, such as for example rotatable prisms, movable light guides, deformable optical components etc. Measurement is usually carried out by determining distance and angles, that is to say in spherical coordinates, which can also be transformed into Cartesian coordinates for representation and further processing purposes. The distance measuring unit can be designed for example according to the principles of time-of-flight (TOF) measurement, phase measurement, wave form digitizer (WFD) measurement or interferometric measurement. For quick and accurate scanners, in particular the measurement time must be short while simultaneously achieving high measurement accuracy, for example a distance accuracy in the millimeter range or below for measurement times of individual points in the range of microseconds or milliseconds.

The distance measuring units used in scanners frequently have internal reference sections, such that calibration of the distance measurement, in particular of the distance offset, can be carried out thereby and thus a high degree of accuracy of the distance measurement is attainable. The slope error or scaling error in today's distance measuring units is often much less than 1 ppm, and recalibration is therefore rarely necessary. However, the distance offset can change over time, field calibrations therefor are widely known today. In older devices, the point accuracy of scanners, as the maximum 3D distance deviation and thus error of the measured point in space, was often limited by the measurement accuracy of the distance measuring unit. More accurate distance measurements required correspondingly longer measurement times, as a result of which an increase in distance measurement accuracies was accompanied by a reduction in the measurement or scanning speed, as surveyed spatial points per unit time. With advances in the field of electro-optical distance measurement, fast to ultrafast laser distance measuring units that still have high distance measurement accuracy are available today.

The critical link in the overall system with respect to point accuracy has thus shifted from distance measurement accuracy to the area of angle measurement accuracy. In order to be able to meet the increased accuracy requirements, the long-term stability of the opto-mechanical system is also of increasing importance.

Commercial scanners with high accuracy nowadays achieve a point accuracy in the range of 5 to 20 mm for measurement distances below 200 m. For distances of up to 50 m, the achievable point accuracy is 2 to 6 mm, and for measuring distances of less than 25 m, a point accuracy of approximately 1 to 4 mm is certainly achievable. With respect to the direction accuracy or angle measurement accuracy, a section of 5 mm at a distance of 50 m for example corresponds to an angle measurement accuracy of 20" (angular seconds) or approximately 100 μrad, which in the prior art already represents a high angle measurement accuracy.

Scanners of the highest precision that are currently available on the market can certainly be categorized into a product class having an accuracy of between 8" and 12", however, such scanner apparatuses with a specified direction accuracy or angle measurement accuracy of better than 20", and in particular of better than 12", are confronted with new problems which in less precise scanners are of no or merely subordinate importance. A 3D scanner having the high specified angle measurement accuracy mentioned above requires careful handling, use and care in order to retain said accuracy. In particular in mobile, portable apparatuses for field use, influences from the environment such as for example direct solar irradiation, bumps, impacts etc. must be expected, which can result in mechanical misadjustment and an accompanying reduced measurement accuracy. Such high-precision scanners are therefore suitable for use in a laboratory, but not in the field.

Known scanners also do not allow the end user to check the accuracy of the instrument in the field without undue effort, as is the custom with classical measurement devices. Any accuracy guarantee can at best be provided by the manufacturer, but this requires time-intensive and cost-intensive short check intervals and recalibration in the factory. The axis error values (for example in the form of angles and distances (offsets)) that are ascertained by the manufacturer, at an institute which is correspondingly equipped therefor, or at a national testing laboratory are usually directly input and stored in the instrument software.

In order to also introduce scanning measurement systems having a polar measurement principle, such as a terrestrial laser scanner, increasingly into geodetic practice, approaches have also been developed to examine calibration and checking of the measurement accuracy for these devices.

However, the error determination is here generally based on a construction which is analogous to the tachymetric measurement principle. However, scanners have an entirely different construction, which is why such an approach does not apply. In particular the error influences of the laser axis can differ significantly from those of a classical target axis.

A known calibration method for example uses a set of planes arranged in space, which are scanned several times in different instrument setups. On the basis of the known algorithms of combining points of view, the calibration method determines the accuracy of the system or calibration parameters from the identical object planes by utilizing one or more adjustment calculations.

To register scanned point clouds, as a combination of measurement data from individual scan cycles in different scanner setups, a transformation (for example Helmert transformation) over identical points can be carried out. The identical points are derived from the data of the scanned target marks, wherein, however, commercial target marks or targets can often not be surveyed by a scanner with the accuracy that is required herefor. An accuracy determination in such a setup, in which subsequently the measurement is also carried out, would also be preferable to the frequent position changes of this method. The entire calibration process is relatively complex, since for a sufficiently accurate determination of the instrument errors, for example more than ten planes in at least three setups are required, which is impractical for a routine field use in geodesy.

Another known method uses a known highly accurate reference point field (tie points), which is fixed for example in a hall on the walls and on the ceiling in the form of a large number of reflective target marks. The coordinates of these reflective target marks are initially calibrated exactly using a highly precise coordinate measuring machine such as a theodolite, and subsequently these predetermined coordinates which are known exactly are correlated with the scanner data by a mathematical calibration model. Such a procedure is too complex for general field use and therefore not practicable. Another disadvantage is the additional falsification of the angle calibration on account of latency times in the synchronization between angle and distance measurement. The ascertained spatial coordinates of reference objects or reference points are falsified on account of the dynamic scanning process, in particular in scanners with a fast rotation axis of typically 100 Hz. A synchronization delay of for example 100 ns in a scanner that rotates at 100 Hz already produces an object offset of 13 angular seconds which is tangential to the scanning movement. This error is reflected in the above method as an index error in the determination of the calibration parameters.

Also known is the method of reversal measurement commonly used in electronic theodolites in geodesy, which takes place as follows: the sighting device is used to measure exactly centrally and accurately to the second, that is to say with an accuracy in the range of a few angular seconds or less, one or more target marks in two telescope faces. The axis-relevant system parameters can be determined or the system accuracy can be verified on the basis of the measurement angles associated with the exact measurements. The system is here used in a direction of (X, Y) gon in the initial state and at approximately (X+200, 400−Y) gon in a rotating state, wherein all elements that contain errors and determine direction, such as the vertical axis, the trunnion axis and in particular the target axis of the sighting device, are rotated.

According to this principle, it is possible to determine a large number of errors, which in theodolites or analogously constructed instruments can substantially be represented by the following calibration parameters:

l,q: index error of the 2-axis tilt sensor, or of the vertical axis tilt
i: index error (angular offset) of the vertical angle sensor
c: collimation error of the collimation line
k: trunnion axis tilt.

A model having such parameterization or analogous parameterization will also be referred to as theodolite model below.

By way of example, the index and collimation errors are determined using a two-face measurement with a preferably horizontal collimation line, since with this arrangement the two types of error can largely be separated from the influences of the other parameters.

Although the laser scanner also makes it possible in principle to scan an object as described above in two alignments of the sensor head, the influences of the angle errors and the distances (offsets) of the scanner axes using point clouds from the first and second alignments cannot be ascertained and eliminated in the same form. For one, this is because exact point association is not always provided on account of the rastered surface-type measurement, especially with point densities in the raster of 5 mm and coarser. Another reason is because the calibration models have been entirely taken up by the theodolite or tachymeter model, and the latter do not correctly describe the measurement system of a scanner. As a result, non-real or even impermissible instrument parameters are determined and, in addition, their influences on the coordinate deviations are incorrectly modeled, which per se cannot lead to the intended improvements.

It is known in the prior art for example to record, for the reversal measurement in scanners, at least six white marking spheres made of wood as test objects in one scanning process in two alignments. The measurement values are here the coordinates of the captured portions of the sphere surfaces, from which the coordinates of the sphere center points are calculated and subsequently the axis errors are ascertained by modeling and adjustment calculation. The determination of the coordinates of sphere center points using scanners, however, largely contains gross errors. For example, at best systematic errors of approximately 3 mm can be achieved using the known three-dimensional test objects at a distance of 50 m, wherein the standard deviation is approximately of the same order of magnitude. Precise calibration is therefore not possible, in particular in conjunction with a device model as a basis which does not correctly describe the axis system of the scanner. The above-mentioned accuracies are simply not sufficient to calibrate errors of the axis system of a scanner.

For highly precise error determination, even in the above-mentioned reference point field that is known with a high level of accuracy, the residuals or the noise components are too great for an adjustment calculation of the scanner data with the reference data. In laser scanners, the above-mentioned classical parameter set of the reversal measurement is also no longer applicable in this form, and there is also no sighting device for a measurement that is accurate to the second.

Although the laser beam can at first glance be considered representative of the collimation line, it has entirely different properties with respect to the directional invariants. This new type of dependence or parameterization of the collimation line has up until now not been taken into consideration in this form in surveying, or it has either not been known at all up until now or at least its influence on the calibration was not known in this form.

As already mentioned, a corresponding robustness of the entire 3D scanner apparatus is also necessary to ensure the required angle measurement accuracies and to obtain highly accurate and reproducible measurement results. For this reason, the components for laser-beam guidance, in particular static or rotating deflection units, must have a high stiffness in order to be resistant to environmental influences. On the other hand, in addition to the aforementioned quick distance measurement, generic scanner apparatuses must also move the measurement laser beam with a correspondingly high speed so as to scan objects within a short period of time. This scan movement can be realized for example with quickly oscillating or rotating mirrors, for example at a high rotational speed or frequency of more than 200 rotations per second. For reasons of dynamics, it is necessary even at medium speeds, below the deflection frequency of 200 Hz mentioned by way of example, for the dimensions of the moving part to be kept as small as possible, which, however, is inconsistent with the requirement of high stiffness.

Users of classical surveying instruments such as theodolites or tachymeters are accustomed to being able to check the accuracy of their measurement system any time and without undue effort, be it for example in a space with known reference marks or in the field by measuring suitable targets in two faces. The known scanners do not provide this possibility, and the user will practically have no option for accurately determining or verifying the measurement accuracy of the device or of calibrating the device.

SUMMARY

It is therefore one object of the present invention to provide a reliable and precise device having a scan function, including for field use.

It is an object to provide a precise device having a scan function, which enables the user to check or correct the system accuracy and/or the calibration of the device in a simple, but exact manner.

It is another object to provide the user with a check and measurement process for a device having a scan function, so that the user in the field can himself check the measurement accuracy and/or newly determine the calibration parameters in situ, if appropriate.

Another object here is to provide a method for ascertaining the accuracy and/or calibration of a device having a scan function, in particular with a device or error model that is matched specifically to such scanners, with the method also being suitable especially for simple execution in the field.

It is another object that said method renders the accuracy determination and/or calibration of a device having a scan function ascertainable with a single device set up.

It is another object here to provide a method for accuracy determination and/or calibration of a device having a scan function, which is suitable in the field for non-surveyed target objects, that is to say target objects without spatial coordinates obtained using a total station or other surveying devices.

It is another object that this method can be carried out in a manner that is at least partially automated, in particular with corresponding user guidance for automatic or semiautomatic execution of an accuracy check and/or calibration process.

These objects are achieved by the realization of the characterizing features of the independent claims. Features that develop the invention in an alternative or advantageous manner can be gathered from the dependent claims.

As already shown, the user of classical surveying instruments such as theodolites can check and if necessary calibrate the angle measurement accuracy of the instrument using simple measurement methods. From the viewpoint of a surveyor, scanners should also provide a possibility for field calibration by the user himself, similar to that which is known from theodolites or total stations. Of primary importance here for the surveyor for the current measurements in the current stationing is not a theoretical device accuracy under laboratory conditions but the current system accuracy.

The calibration method according to the invention, which will be explained in detail below, relates to a device having a scan function, in particular to a device measuring in polar coordinates, for example a 3D scanner, having an electro-optical distance measuring device with a laser axis as the target axis, a motorized optical deflection unit, which deflects the target axis by a variable deflection angle with respect to the distance measuring device, in particular wherein the target axis (3) is deflected by a mirror which is movable with respect to the distance measurement device, and at least one angle measurement device for determining an angular position of the deflection unit.

The calibration method contains the following steps:
a first survey of angle coordinates of a target mark in a first angular position of the deflection unit as the first face and
a second survey of angle coordinates of the target mark in a second angular position of the deflection unit as the second face, wherein the first face and second face differ, in particular wherein the first face is rotated relative to the second face in two axes such that the target axis in both faces points at least approximately in the same spatial direction.

The two axes in this case correspond to the axes of the deflection unit, which may be malpositioned as compared to a theoretical axis system on which the surveying is based. One of the axes for example is a vertical axis which is rotated by approximately 200 gon, and the other axis is a trunnion axis which is rotated about 400 gon minus its angular position with respect to the vertical axis in the first face.

Here, the first and second surveys of the target mark are carried out using images, which with a camera with a field of view, the optical axis of which is deflected by the deflection unit with respect to the camera, and calibration parameters are determined on the basis of the angular positions and the angle coordinates in the first and second faces.

Here, the survey is carried out using images with a resolution of the image coordinates of the target mark with a high (angular) resolution of the field of view, in particular with a resolution of the images of less than 3 angular seconds, preferably of less than 1 angular seconds, which can be achieved by way of subpixel interpolation of the camera images.

The basis used here is in particular a mathematical device model, which represents the mechanical setup and the beam guidance of the device having a scan function, specifically a device model which (in contrast to the theodolite model) has collimation and/or index errors of the target axis which are dependent on the elevation of the target axis.

Subsequently, the accuracy, residuals and/or statistical characteristics of the system accuracy can be ascertained on the basis of the calibration. The calibration, in the form of calibration parameters, can be used to correct measurement values which are ascertained subsequently, in particular point clouds. Calibration parameters can be determined on the basis of the angular positions of the at least one axis, in particular however of both axes, and the angular coordinates in the first and second faces.

Initially, as a partial aspect of the present invention, and as a basis for the further explanations, a mathematical device model and the calibration-relevant parameters of a laser optical scanner are identified. To this end, the aspects of an exemplary embodiment of a scanner explained below are discussed. The general considerations with respect to beam guidance made here can be applied analogously by a person skilled in the art also to alternative embodiments.

On account of the aforementioned high rotational speeds of the scanner rotational head, in scanners the laser source is usually arranged in the support. The direct coupling of the target axis to the trunnion axis, which can be found in the theodolite model, is thus no longer present, since the laser source is not moved directly together with the trunnion axis. As a result, in a two-face measurement, the collimation line is not rotated as is the case for example in the case of a theodolite. As a result, particular errors cannot be identified correspondingly uniquely in a scanner with a classical two-face measurement either, as is carried out in theodolites.

One possible parameter set of calibration parameters of an exemplary embodiment of a scanner, in particular with the above-described laser arrangement, is for example as follows:

l,q: index error of the 2-axis tilt sensor or of the vertical axis tilt;
i: index error (angular offset) of the vertical angle sensor;
rc, ri: angle error of the laser source with respect to the rotation or trunnion axis;
pci: angle error of the rotational mirror with respect to the rotation or trunnion axis;
k: tilt of the rotation or trunnion axis with respect to the vertical axis.

If the distance and/or the tilt angle of the device setup are also included as further parameters, the problem of a system calibration for the entire surveying system arises. In said system calibration, axis, setup and distance measurement accuracy are checked in one method and calibrated if appropriate, if the latter do not correspond to the specifications or requirements.

For the sake of simplicity, primarily the angle errors of the axes will be discussed in detail below. In the exemplary embodiments, the axis distances (offsets) are not explicitly taken into account, but without excluding the general case, in which said axis distances and further calibration parameters are also determined according to the invention. By way of example, the axis offsets can be ascertained on the basis of an angle error determination at a number of distances. A person skilled in the art of error determination in surveying devices can also determine in an analogous or similar manner the further system calibration parameters of the total system according to the present invention and combine them with further methods that are known and routine measures in geodesy.

A point cloud generated subsequently in object recordings can then achieve the specified or required high measurement accuracy with certainty. The device setup can remain unchanged during the calibration and measurement.

Operation of the check and/or calibration process can be made available via a local user interface directly in situ on the scanner. The user interface can alternatively also be realized by a remote user interface, which is connected using cables or radio signals, or by software on a PC, laptop, tablet PC, smartphone etc. A partial aspect of the present invention is in particular also the provision of a calibration program, which instructs the user using a user interface to ascertain the systematic axis and offset errors of the scanner using scanner data of scanned and identifiable objects or target marks, preferably in two alignments of the sensor head.

In scanners, the lack of a sighting device for measurement that is accurate to the second makes it difficult to carry out the calibration method known from theodolites. Surveyors are sufficiently familiar with the loss of precision of the calibration parameters owing to inaccurate observations and measurements on account of the variance-covariance error propagation. However, as explained above, in scanners with modern distance measuring units it is in particular the angle measurement which becomes a critical component with respect to the point accuracy that can be achieved. The angle measurement accuracy on target marks in scanners is usually no more accurate than 10 arcsec, as a result of which a calibration which is produced using such observations cannot achieve the precision required in geodesy. Not only is there a lack of target marks which are suitable and recommended therefor (rhombic patterns, spheres, pyramids, . . . ), but also of corresponding application programs and user interfaces to be able to carry out error determination and error assignment in scanners to the required precision.

High angle precision of polar measurements to target marks or target objects, however, can be achieved by a measurement using a camera. Modern scanners are often equipped with an integrated camera, with which image information that is also associated with the point clouds of the surveyed spatial points can be recorded. Known are in particular panoramic images, also referred to as fulldome recordings. Here, the camera usually has a surface-type image sensor and at least one objective having focus and/or zoom function.

The present invention utilizes such a camera integrated in the scanner, which camera is mounted in a position which is fixed with respect to the axis system and is accurately defined. By way of example, the camera is mounted in the continuation of the trunnion axis in the support. The laser of the distance measuring unit can be placed on the same side, or alternatively on the opposite side of the trunnion axis. The camera is preferably arranged such that the scanner or laser target axis is located in the field of view (or field of vision) thereof, as an angular region capturable by the camera. Cameras which are arranged in this manner are also referred to as boresight cameras. In an axis system without errors, the ideal scanner target axis would lie in the normal plane with respect to the trunnion axis, and the three axes would intersect together with the vertical axis in a point, which intersection point usually also corresponds to the origin of the measured polar coordinates. The principle according to the invention is alternatively also possible with a camera which has a parallax with respect to the scanner target axis, although for the sake of simplicity, and without being limiting, the explanations below will refer to a boresight camera.

In the embodiments of integrated cameras, two aspects in particular are worthy of note. Firstly, for a correspondingly accurate calibration, the attainable angular resolution and thus also angle measurement accuracy of the camera must be in the angular second range. Certainly the camera must be capable of resolving angles which are smaller than that angle accuracy which is to be attained by the calibration. In addition, the field of vision of the camera must not be too small. Typical fields of vision are at least approximately 15° or more.

Before the actual check begins, the 3D scanner should be leveled as well as possible, as a result of which it is also possible to carry out a check of the tilt sensor, for example by the latter likewise rotating about the vertical axis and the tilt being determined in at least two known angular positions. In any case it must be ensured that the scanner during the calibration and measurement has a stable position, cannot sink and, if possible, is protected against direct sunshine.

In addition to the already explained stable setup of the scanner as the surveying instrument, a target object is required that is just as stable. For example, an A4 target plate is arranged in a position that is fixed in particular relative to the scanner, for example at a distance of 15 m to 30 m, and is as perpendicular to the target axis or laser axis as possible. Fixing of the target plate as the target mark should here ensure an accuracy of the alignment or center point determination of 0.2 mm or better. During the calibration process, the setup of the instrument and of the target plate must not change.

The target plate is here configured such that it is possible to determine the position of an optical feature by way of the camera, for example a center point determination of the target plate, with a precision of typically 1 to 5 angular seconds. The definition of the target plate can be present for example as a PDF file. Its physical realization can then be produced using a commercial printer. Alternatively, other target objects with two-dimensional or three-dimensional shapes and great brightness contrasts can also be used. In any case, the scanner with the camera requires unobstructed view to the target plate as the target object.

An exemplary check and calibration process will be illustrated below, which process ensures a sufficiently exact angular determination so as to verify the system accuracy. This process can also be carried out in the field by a user. The scanner has the capability of being able to carry out a measurement operation in each case in two measurement faces, as is known from the previously described two-face method.

The check process using a scanner according to the invention having a camera can in this case comprise the following steps which will be explained in detail by way of example. The specific combination, sequence and practical configuration of the steps can depend on the parameters to be determined, on the locational situation and on the required accuracies. The check and calibration process should preferably be attained using a single scanner setup.

In a first step, a setup of the scanner should be selected. A fixed setup over solid ground is essential in this case. The scanner can in this case be set up at a recommended distance from the target marks or target objects provided, if the latter are already known in advance. Alternatively, the scanner position can also be chosen freely, and the target plates can be correspondingly positioned thereafter, as described in step 2. By setting up in that position from which a subsequent measurement is also to be carried out, it is also possible to avoid any misalignments owing to a change in stationing of the scanner between calibration and measurement.

In a second step, the user defines the calibration parameters to be checked, for example all of the parameters or a selective choice thereof. In addition, the user can define a prespecified accuracy to be achieved either for the total system or separately for each parameter.

The scanner according to the invention calculates and displays a proposal for the elevation of the "scan field" with the extension of the elevation sector above or below the horizon, in which the target objects, target plates or target symbols are advantageously to be applied. Furthermore, the instrument, or specifically a digital calculator integrated therein or integrated in an operating device having corresponding software, calculates a recommended, optimum distance or distance range from the target objects. Typical check distances are for example 10 m to 50 m between target plates and scanner. By way of example, it may be advantageous to position at least one target plate as close as possible to the horizon at 100 gon and as perpendicular as possible with respect to the target axis, as is also done in theodolite check methods to determine the target axis error.

If, for example, at least some of the calibration targets are prespecified, if the possible target plate positions are restricted on account of the surroundings, or if the experienced surveyor can already estimate advantageous target positions, it is also possible to at least roughly provide the device with known target positions, or to let the scanner autonomously identify the target plates in an automated search run. It is necessary to ensure a fixed, firm setup during the calibration process even when using target plates.

To check the number n of previously selected parameters to be checked, generally (without taking into consideration condition equations) at least n measured coordinates of appropriately configured target marks should be recorded. In this case, appropriately configured or advantageously setup means specifically that the target plates be mounted at least approximately at the positions proposed by the device or at equivalent positions, and that the target plates can be observed in two faces.

The user may also be requested by the user interface to place for example 1 to 10 target marks in the corresponding elevation sector, or to determine correspondingly appropriate, natural target marks in these areas. The user may also receive a recommendation to possibly readjust target plate positions, which is recommended for optimizing the determinability of the calibration parameters.

If the scanner has a visible marking laser, the scanner can use it to mark for example a proposed target plate position or a corresponding position region and to monitor, for example using the distance measuring unit, and to signal optically, acoustically or using a remote user interface to the user that a recommended distance range has been reached.

It may for example be a selection criterion of the proposed target position that in this case some of the target points are placed if possible at various sight angles, for example with vertical angles at the upper and at the lower edge of the elevation sector and also close to the horizon (100 gon) for the measurement. Responsible for the user guidance is specifically a software program, which was developed using a sensitivity analysis of the functional model of the laser scanner.

With an optimum calibration field of appropriately configured target plates or natural targets, the required accuracy in the determination of the calibration parameters can be ensured. However, the method can also be carried out in the presence of necessary deviations of the proposed target mark positions due to the environment, but if appropriate with reduced accuracy or reliability of the calibration process as compared to an optimum arrangement, which the user guidance of the user interface can also appropriately point out.

Subsequently, a manual, semiautomatic or fully automated calibration of the directions to the target points is carried out, wherein the scanner device recognizes and/or identifies the targets and can subsequently measure them automatically in a targeted manner for accurate surveying. The scanner can in this case also check whether the target objects are in the required distance range and the recommended elevation sector. At the same time, it is also possible for the orientation of the target plates with respect to the target axis to be roughly checked. In a fully automated operation, the camera supports the search for target points. The camera also ascertains the particular brightness contrast of the target mark and checks whether it suffices for precise angle determination.

Subsequently, optional calibration of the camera with respect to the current axis system can be carried out, wherein this step can be carried out not each time the method is carried out, but for example only in the context of a works calibration or at relatively large check intervals. In a large number of generic scanners, a high stability of the imaging optics and the arrangement of camera with respect to the vertical and trunnion axis can be assumed. This optional step for camera calibration can also be carried out if the tilt of the trunnion axis with respect to the vertical axis is still undetermined.

Optional determination of the camera zero point can be carried out for example with a zenith targeting operation. Such a zenith targeting operation may be carried out as follows:

- Applying one or more target plates in a row in the zenith (for example mounting to the ceiling).
- Determining at V=0 gon in face 1 and 2 the target plate with the camera.
- Moving the target axis in the V direction until the target plate is located at the edge of the field of vision of the camera.
- Determining the V angle using the angle encoder at this elevation direction and capturing the target plate in face 1 and face 2 using the camera.
- Moving the target axis in a further V direction and determining again in this third elevation direction the V angle using the angle encoder and capturing the target plate in face 1 and face 2 using the camera.

All relevant calibration parameters including the camera zero point can be determined from the measurement data and camera images ascertained in the process. The camera zero point in this case can be defined in any direction having direction parameters $(rc, ri) = (0,0)$, as a result of which a check and/or new calibration of the laser target axis is simplified. If the camera zero point is known in this manner, a further measurement can be used to determine directly the laser beam direction using the parameters $(rc, ri)$ in the coordinate system of the camera. The optional check and calibration of further internal camera parameters such as focal length and so on is carried out using a matrix-type scanning operation over a target plate that is placed approximately perpendicular to the target axis, preferably at approximately V=100 gon.

In a first substep, the device determines a required measurement point density of the subsequent matrix scan from the required prespecified accuracy and the contrast of the image of the target plate. The target axis and the field of view of the camera of the scanner subsequently moves in a raster-type manner over the target plate, during which the camera records in each case images of the target plate, wherein the angle sensors of the deflection unit capture the angular positions of the axes assigned to the images, for example with Hz as the horizontal angle of the vertical axis and V as the vertical angle of the trunnion axis. The result is a set of images of the target plate with the associated axis positions, which images are recorded in the 2D raster of the matrix scan and are displaced according to the matrix raster. Using image processing software, the positions of a visual feature of the target plate, for example its center point, in camera coordinates, that is to say in the image plane, are calculated. On this basis, the calibration parameters such as rotation of the camera with respect to the axis system and/or scaling of the camera pixels with respect to the angle sensors can be determined. Deviations from the orthogonality of the transformation matrix thus determined between pixel coordinates and axis system give a first indication of any angle errors of the trunnion axis.

In a further measurement, the laser beam direction with respect to the coordinate system of the camera can be determined. This process depends greatly on the specific embodiment of the scanner's internal setup. In the simplest case, the laser spot is projected onto the same target plate, the position of which is the captured by the camera and surveyed in the image of the camera. Thereby the laser target direction in the camera coordinate system is determined.

In the next step, the scanner instrument starts the actual data evaluation to ascertain the instrument accuracy. The camera is used to photographically record the previously set-up targets, in two faces, using the camera in corresponding two images. Subsequently, a similarity transformation, in particular in the form of an image rotation and image translation, is carried out between the images which were recorded in each case in the two faces. In known target object patterns, this can be carried out for example using what is known as template matching. Using a geometric axis model matched to the scanner, it is now possible to calculate the axis error of the scanner from the data of the similarity transformation of the images recorded under the various sight angles of the respective target plates. As was already explained above, the camera image together with the angle sensors allows this process to be carried out with an angular resolution in the angular second range.

Alternatively, the target directions and rotations ascertained using the camera can also be evaluated using a regression analysis. The observations of a target plate in face 1 and face 2 are correlated with the model of the spatial scanner coordinate system. Using adjustment calculation, for example according to the Gauss-Markov or more generally according to the Gauss-Helmert model, estimated values for the axis parameters to be determined are ascertained therefrom. At the same time, improvements or residuals are present in this case as the result. The residuals provide information on the point measurement accuracy at the target plates and thus on the currently achieved angle measurement accuracy of the scanner instrument.

A covariance matrix of the estimated parameters derived from what is known as the cofactor matrix of the calibration model can be used as a measure of the statistical measurement accuracy of the instrument to be checked. The differences between new and old parameters provide information on systematic measurement deviations and the general scanner system stability.

For example, the scanner instrument displays on a display of the operating unit the old and the new ascertained values of the selected calibration parameters. To check plausibility, additionally also the confidence intervals for the old and the new parameters can be displayed or validated in the device.

If the residuals or the new estimated parameters are within the required or specified accuracy interval, the user can store the new calibration parameters and terminate the check process. The new calibration parameters can then be taken into account when determining the measurement values. However, if the angle measurement accuracy after the above-mentioned steps is insufficient, the user may proceed as follows.

If for whatever reasons the required and specified accuracy has not been attained, the user is informed of this.

One reason could be an unfavorable arrangement of the scanner setup with respect to the target objects. In this case, the instrument may make a proposal to the user as to how the target plates for the calibration can be placed more advantageously, and subsequently repeat the check and calibration process.

Another reason for insufficient accuracy could be associated with unfavorable light conditions, which may possibly be alleviated by changing the position of the scanner and/or the target plates. Alternatively, artificial illumination of the target plates may also help. In order to be independent of unfavorable light conditions, the device according to the invention may also be equipped with a target illuminating means, for example. Such target illuminating means are known for example from total stations with automatic, camera-supported target measurement. A scanner which is thus equipped can carry out the required measurements independently of the external illumination situation.

Once the scanner is calibrated, the evaluation unit can correct the influences of the axis errors and thus produce precise and highly accurate point clouds of the scanned objects. The system accuracy or measurement accuracy of the scanner device can thus be considerably increased.

Generally, it is recommended to check and if appropriate determine again the accuracy-relevant calibration parameters before each precision measurement, in particular once the scanner has been set-up anew.

Specifically, it is recommended for the determination of instrument errors to be carried out in the following situations:
  before precision measurements that require high accuracies and reliability;
  after relatively long transportations, during which the device may have been exposed to shock, impact or vibrational stresses;
  after changes in temperature, in particular of more than 20° C.;
  after a relatively long storage period of the device.

BRIEF DESCRIPTION OF THE DRAWINGS

The method according to the invention and the apparatus according to the invention will be described below in more detail purely by way of example with reference to concrete exemplary embodiments illustrated schematically in the drawings, and further advantages of the invention will be touched upon. Specifically:

FIG. 1 shows the illustration of an exemplary geodetic workflow during use of a device according to the invention having a scan function;

FIGS. 2a and 2b show the illustration of the principle of the two-face measurement with a precise device according to the invention having a scan function;

FIG. 3 shows the illustration of a first exemplary embodiment of a device according to the invention having a scan function with a boresight camera, accommodated laterally in the support;

FIG. 4 shows the illustration of a second exemplary embodiment of a device according to the invention having a scan function with a boresight camera which is superimposed parallel to the laser;

FIG. 8 shows the illustration of a fifth exemplary embodiment of a precise device according to the invention having a scan function with an exemplary collimation-axis and trunnion-axis tilt error;

FIG. 9 shows the illustration of an embodiment of a device according to the invention having a scan function with an add-on collimator for laser beam detection;

FIGS. 10a, 10b, 10c and 10d show the illustration of exemplary observations using a boresight camera in two faces in a device according to the invention having a scan function;

DETAILED DESCRIPTION

Figure 5A:
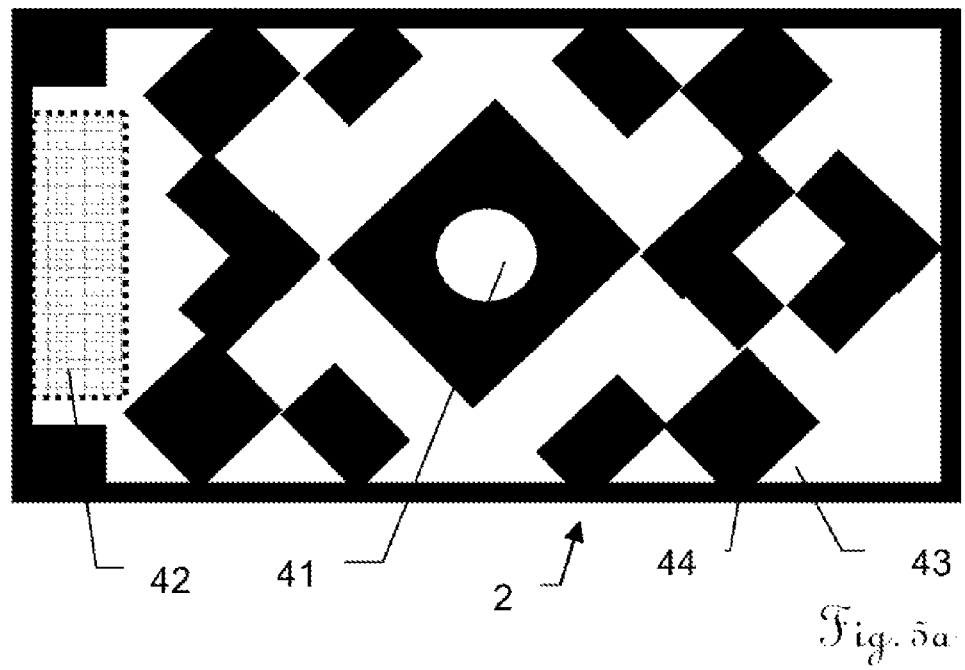
FIG. 5a shows the illustration of an exemplary embodiment of a target plate for the check or calibration method according to the invention.

Referring to FIG. 1, a possible geodetic workflow will be explained below by way of example. In classical surveying tasks, the measurement instrument such as a theodolite or a total station, is placed over a known ground point 9001, 9002, 9003.

Frequently, portable instruments, in particular when being set up, are subject to high shock-type accelerations, for example when the device is being latched into an adaptor. Even when the device is positioned in a centering foot, the direction-relevant elements in the angle sensors, holders or target axis guides, such as laser mirrors, may minimally change their position. As a result, the stored calibration values or calibration models are possibly no longer completely valid, and subsequently the measurement accuracy, in particular of the angle measurements of azimuth and elevation, is also no longer within the specified ranges. In this case, the scanner needs an—at least partial—recalibration or possibly a complete new calibration in order to be able to achieve the required or specified measurement accuracy.

The geodetic stationing of the device comprises among other things the vertical positioning of the instrument, input of the instrument height, an orientation towards North, and establishment of the setup with at least one backsight point 12. The backsight point 12 can be, for example, a target mark with a known height over the assigned ground point. Scanners 1 for use in geodesy are—in comparison to theodolites—likewise equipped with a centering adapter for setting up over a reference point, with height referencing of the trunnion axis (rotation axis of the mirror) of the scanner, with a tilt sensor and corresponding user software for operating these and other functions so as to match the measurement processes as far as possible to the known work processes of classical surveying using theodolites or total stations.

Once stationing is complete, the measurement instrument 1 is referenced with respect to a spatial or subordinate coordinate system 14. Using the backsight target 12, the scanner 1 is also established in the coordinate system 14. If the scanner 1 is positioned over the point 9001, it can for example also measure further points 9002, 9003 in order to associate the data items of the multiple scan thus obtained with one another in a subsequent setup at those further points. Optionally, it is also possible to measure existing reference targets 10 in the capturable field of view of the measurement device, with which the measurements can be referenced with respect to a spatial or superordinate network or coordinate system. Examples shown of the objects to be surveyed are the buildings 11 and 13, the road 15, or the terrain 16 with the group of trees.

Devices according to the invention having a scan function and the described methods can, however, also be used analogously inside buildings, mines etc.

The measurement accuracy of the system is here a critical factor, both when surveying the individual setup points and the object scanning data itself. High measurement accuracy can generally only be guaranteed if it is checked or newly determined and, if appropriate, can also be corrected or calibrated in situ. An accuracy check and/or calibration according to the invention is therefore carried out if possible directly after the stationing, before the establishment in the coordinate system or other measurements.

FIGS. 2a and 2b show by way of example a setup of a scanner 1 with respect to a target plate 2 for the calibration process according to the invention, which is preferably carried out in two faces. FIG. 2a and FIG. 2b show a scanner measurement of a target 2 in each case in a first and second face. The scanner 1 here has two rotation axes, the axis 22 with the associated azimuth angle sensor, which is referred to as the vertical axis, and the axis 23 with the associated elevation or vertical angle sensor, which is referred to as the trunnion axis. The line 21 symbolizes the normal with respect to the axes 22 and 23. In the case of an ideal and error-free setup and calibration, the vertical angle of the axis 22 corresponds to 0 gon, and that of the axis normal 21 corresponds to 100 gon. In the case of no errors and exact leveling, the axis 23 lies in the horizontal plane. The arrow 3 represents the target axis 3 and at the same time the measurement direction of the distance measuring unit of the instrument 1, which is aimed onto the exemplary target 2. The angle 34 is the sight angle or elevation angle and the complementary angle 31 is referred to as the vertical angle.

Picture 2b shows, in comparison with picture 2a, the instrument in the other position of the two-face measurement, in which the vertical axis 22 (symbolized by the arrow 32) is rotated by approximately 200 gon and the rotation axis 23 (symbolized by the arrow 33) is rotated by (400 gon-VI), wherein VI represents the vertical angle in the first face. In the error-free or sufficiently calibrated case, as a result, the same target point is measured, or any errors are determinable on the basis of the occurring directional deviations.

The determinable types of error in this case are also dependent on the positioning of the targets 2 with respect to the coordinate system of the scanner 1. Depending on the accuracy requirements specified by the user, the instrument 1 can, as explained above, provide indications relating to the number of the targets plates 2 to be placed and also propose at what distances 36 and elevation angles 34 they should be mounted.

FIG. 3 shows schematically an example of a scanner 1 according to the invention having a boresight camera 4, which in this embodiment is accommodated laterally in the support. In this case, only one last mirror in the beam path is moved about a fast axis (usually—but not necessarily—the trunnion axis). The further parts of the scanner are accommodated in a static part or in a part that is moved or rotated at a relatively slower speed in a second, slow axis 22. Mostly—but not necessarily—this is the vertical axis. In such apparatuses, the camera 4 itself is not rotated about the inner axis (trunnion axis) which generally rotates very quickly. The entire distance measuring unit or at least the laser source 5 of the distance measuring unit is usually also arranged outside the fast, inner axis.

A scanner, as a device measuring in polar coordinates, is, in particular due to the mirror deflection, no longer constructed such that systematic errors, such as for example target and trunnion axis errors, can be determined using a classical two-face measurement and averaging, as is the case for example in tachymeters. Owing to the different construction of the devices, in particular the beam guidance of the measurement radiation, this must be taken into account when calibrating.

With respect to the calibration model, this results in collimation errors and index errors no longer occurring as an invariant/constant, as is the case in the classical theodolite. There, the telescope, when changing from face 1 to face 2, is rotated together with the sight line and laser distance measuring unit—that is to say the entire telescope—by 200 gon about the target axis, wherein collimation and index errors occur as constant angle offsets with respect to the normal 21. In the scanner, on the other hand, the classical calibration model of the two-face measurement breaks down. The mathematical model of the scanner differs from that of the tachymetric measurement principle. The laser 5 or the electro-optical distance measuring unit 5, with which the laser is to be associated, is also located, in the example shown, outside the trunnion axis, that is to say directly on the support. As indicated schematically, the camera 4 can be realized with a surface-type image sensor (for example a CCD or CMOS chip) and an optical unit symbolized by a lens.

By way of example, commercial CCD or CMOS sensors have a size of $\frac{1}{1.8}$ inches, $\frac{1}{1.5}$ inches or 1 inch with a pixel number of 6 to 12 megapixels, with the pixel size typically being around 2.5 µm. In a practical example of such an integrated camera, for example, a $\frac{2}{3}$-inch CMOS sensor with a resolution of 8 megapixels can be used. The aspect ratio of the active surface of the CMOS sensor is typically 4:3, as a result of which the pixel number is 3264 pixels× 2448 pixels. Such a sensor, in combination with an objective with a corresponding focal length, would both meet the aforementioned field of view requirements and enable the required angle measurement accuracy of approximately 1 arcsec. Typically, pixel interpolations of 1/50 pixels can be achieved.

The optical unit can, depending on the requirements, be configured as a fixed-focus or a focusable optical unit, wherein the latter can be focused for example using the measured distance information of the distance measuring unit. In the case of a continuously variable or stepped focus and/or zoom function, it should be ensured in particular that, according to the present invention, the current zoom factor and target line process errors are accordingly taken into consideration during the calibration and measurement.

The beam paths of laser and camera are superimposed in the embodiment of FIG. 3 for example into the fast inner axis using mirrors. This constellation, which deviates from that of a classical theodolite, should be taken into consideration in the mathematical calibration model and in particular in the configuration of the two-face measurement using a scanner. Furthermore shown are the setup on a fixedly mounted stand 9 and an example of a target plate 2 having target markings with a target axis 3 that is aimed onto the latter, which in the scanner 1 is determined by the direction of the laser beam for distance measurement.

FIG. 4 shows a further customary embodiment for the beam deflection in a scanner, consisting of a rotation head 7, which is rotatable about the fast axis 23 (trunnion axis) and a tilted, reflective surface 29. Superposed into the beam path in parallel with the measurement beam emitted by the distance measurement module using laser 5 is the optical axis of the field of view of a boresight camera 4 (illustrated symbolically) using a—preferably dichroic—beam splitter 6. The optical axis of the camera can alternatively also be superposed using a hollow shaft from the opposite axis side, as a result of which the field of view of the camera with respect to that of the laser is diametral. For the process of the accuracy determination and calibration according to the invention, this is, if it is accordingly taken into consideration, not relevant. Both configurations of beam deflection and also further alternative embodiments of beam guidances are compatible with the present invention.

FIG. 5a shows an example of a graphical configuration of a target marking (41, 43, 44) suitable according to the present invention as a target plate 2, which is used to explain a few features of such a target mark. In addition to such specific targets plates 2, however, natural targets, which to a corresponding degree satisfy the described features, can certainly also be used. However, to achieve the highest degrees of accuracy, it is recommended to use targets plates 2 which were designed specifically with these features in mind.

The exemplary target markings (41, 43, 44) have a geometrically indicated symmetry point or marking point 41. The target object having markings can be configured as a planar target plate 2 or as a spatially structured target object 2. Use of three-dimensional target objects, however, is not absolutely necessary according to the present invention.

The previously mentioned marking 41 is intended to be optimized primarily for the camera, but also for the laser, that is to say in addition to good visibility on the camera image, it is also intended for the laser beam to be reflected back of the distance measuring unit. By way of example, a white zone 41 or a zone 41 having reflective film is located in the center of the target plate 2 in order to uniformly image the measurement laser of the scanner over the entire beam cross section and correspondingly reflect it back correspondingly for the distance measuring unit and the camera.

Strong brightness contrasts of the target marks (41, 43, 44) make it easier for the control and evaluation software to automatically find the target plate, identify the orientation, and determine the coordinates of the marking point or more generally of the origin of the local coordinate system of the target plate, and at the same time ensure high angular resolution in azimuth and elevation. By way of example, the illustrated pattern has a high contrast in the wavelength range of the camera with many edges and a size and orientation such that this is capturable by the camera without aliasing over the entire recommended distance range. The exemplary pattern with black 44 and white 43 geometric figures is here just one of many variants. In the specific case of an integrated camera with a fixed-focus optical unit, the patterns must not be too small, so that any out-of-focus images are also still evaluatable.

In order to be able to identify the targets individually, a further region 42 may be provided, which contains an identification code and/or permits determination of the orientation of the plate in space, which can be evaluated correspondingly using the camera image. An optional, retroreflective zone can serve for example for automatically finding the target plates.

For less precise calibrations, one target mark suffices, which is provided, for example, as a PDF file by the manufacturer and which can be reproduced physically by the user himself using a printer. For higher classes of accuracy, a stable, dimensionally accurate target plate 2 is recommended, for example a planar stiffened, self-adhesive film or a plastic or metal plate.

Figure 5B:
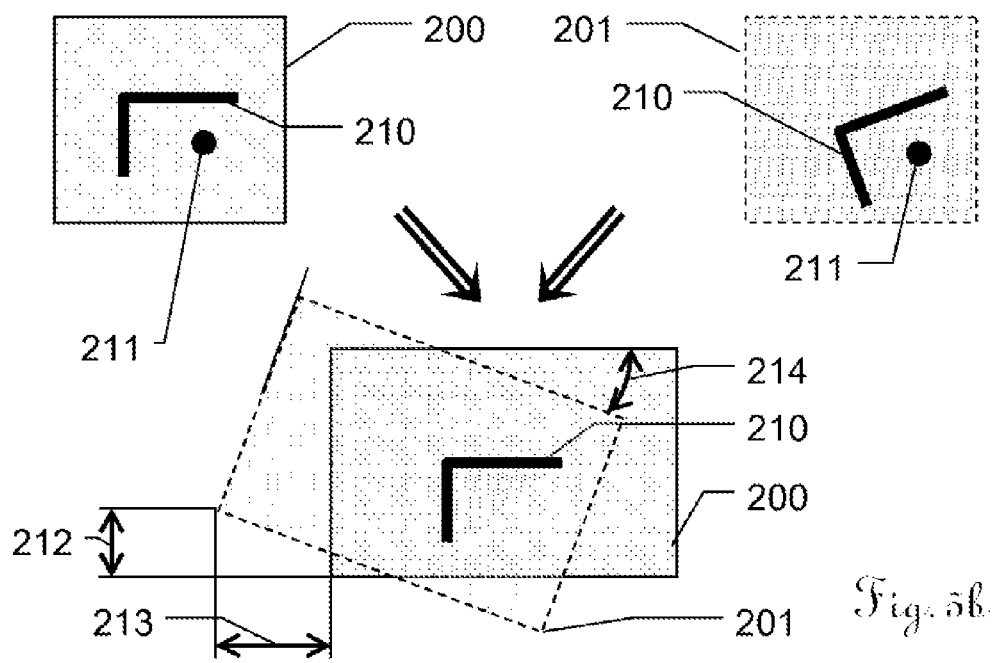
FIG. 5b shows the illustration of an exemplary survey of an optical feature using a camera.

FIG. 5b shows the principle of the survey using previously calibrated camera and image processing. The field of view of the camera, which becomes capturable with a resolution of image points or pixels by a surface-type image sensor, is represented by the rectangles 200 and 201. The field of view 200 in this case shows the recorded image in a first face, and the field of view 201 is that in a second face. The image shows, symbolically as an L symbol, the local coordinate axes 210 of an observed target plate. The reference (precisely valid for this setup) between the local coordinates of the target plate (for example in gon) and the pixel coordinates of the camera can be determined using the target marks (41, 43, 44). The pattern corresponds to an absolute coding for direction and rotation angle about the target axis, the center point of the coding pattern can for example be used for direction measurement, and the alignment of the pattern can be used for capturing the rotation angle about the target axis. The camera zero point (with rc=0 and ri=0) can be determined as the zero point of the target direction and is—as already explained further above—determinable for example using zenith aiming by the direction of the vertical axis. Thus, the direction 212, 213 are exactly defined and surveyable with respect to the target plate and its rotation or tilt 214. In a further optional step, the laser is turned on, and the laser target axis becomes visible for the camera on the field 41 as a light point (laser spot) 211. The image processing means calculates on the basis of the light point of the distance measurement laser surveyed in image coordinates the angular position of the target line. As a result, the orientation between laser and camera is known. In addition, the effective focal length (calibrated focal length) can be checked optionally using a distance measurement. The point 211 symbolizes the imaging of the point of incidence of the distance measurement laser on the target mark by the camera, which is surveyable in camera coordinates as described, thereby the two direction parameters rc, ri of the laser are ascertained and the effective scanner target axis is thus defined.

Since the same target plate is measured in both scanner faces, the global direction coordinates azimuth (Hz) and elevation/sight angle (V) correspond in an error-free axis system. In contrast, if the axes contain errors, the directions and object rotations captured with the camera differ with respect to expected transformations of an error-free system. By way of example, the errors could be ascertained, as is illustrated in the lower half of FIG. 5b, by superpositioning the two images from the first and second faces. The superposition is chosen such that the local coordinate axes 210 of the two images 200 and 201 are superposed. The dimensions illustrated here by measurement arrows here illustrate the necessary image transformations in the form of translation and rotation, wherein certainly other transformations such as scaling or image distortion or distortion correction can also be used. Translations are associated with V index error and trunnion axis tilt, whereas a deviating object rotation indicates an angle error of the deflection mirror trunnion axis. As an alternative to this image-based evaluation method, which in addition to the object direction also captures the deviation of the expected rotation with respect to the target axis, a simpler, purely direction-based method is described in the explanations regarding FIG. 10.

Figure 6:
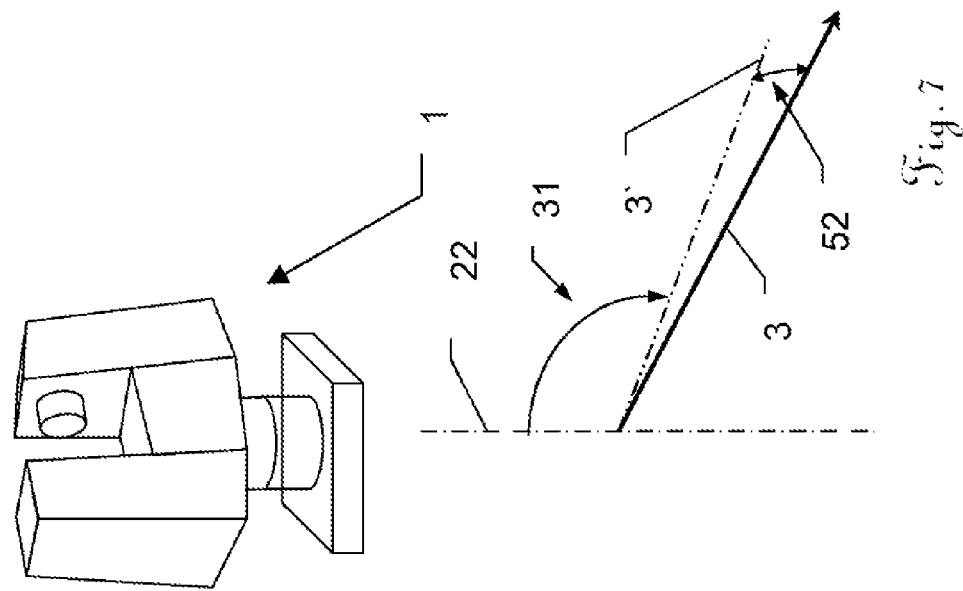
FIG. 6 shows the illustration of a third exemplary embodiment of a device according to the invention having a scan function with 2-dimensional tilt sensor.

FIG. 6 illustrates by way of example a scanner 1, for which the axis system thereof and a few exemplary errors and their effects are illustrated schematically for explanation purposes. This form of illustration will also be continued analogously in FIG. 7 and FIG. 8.

FIG. 6 serves for the explanation of a tilt measurement using a dual axis sensor. It shows a measurement of the error-containing plummet direction 24 despite vertical setup of the device 1, with the true plummet direction coinciding with the vertical axis 22. Longitudinal and transverse errors are defined in a normal plane with respect to the axis 22 using the parallel 20 with respect to the normal 21. For precise and highly accurate measurements, the deviations in the longitudinal angle 50 and transverse angle 51 relative to the true plummet direction 22 must be determined using conventional reversal methods. The process used for this purpose is comparable to that used in a conventional theodolite, in which in the calibration process the angle offsets 50 and 51 are averaged/subtracted using a measured tilt in an arbitrary starting angle of the vertical axis and with a vertical axis which is moved by 200 gon (180°). Measurement values in other moving angles of the vertical axis can of course also be taken into consideration in order to increase the achievable accuracy and/or to determine statistical characteristic variables. Furthermore, FIG. 6 shows the true horizontal plane 25.

Figure 7:
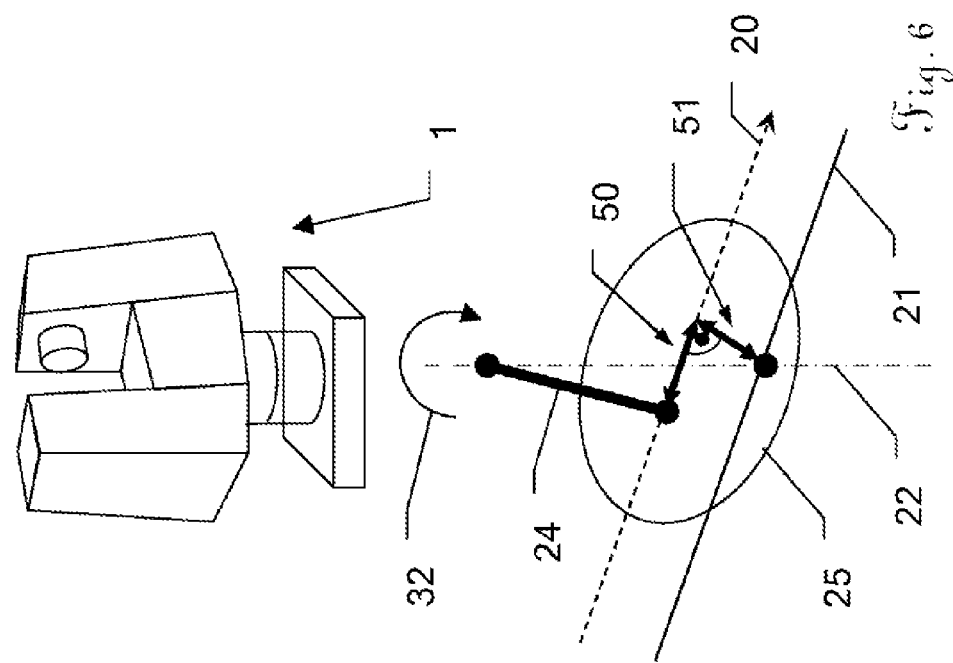
FIG. 7 shows the illustration of a fourth exemplary embodiment of the precise device according to the invention having a scan function with an exemplary target axis error.

With reference to FIG. 7, the influence of the target axis deviation in scanners 1 according to the invention will be explained. In classical surveying instruments using a telescope as sighting device, a remote target point is measured in two faces with exact orientation, as a result of which what is called the V index can be determined as a constant. In 3D scanners 1, this is hardly possible in this form owing to the lack of a telescope targeting unit and the laser beam which is alignable with angular second accuracy in an extremely complicated manner. A more exact analysis of the error influences on the angle orientation of the laser beam also shows that the vertical angle index (V index) present in telescope instruments as parameters for describing said error no longer exists in this simple form. This is because of the differently constructed setup and profile of the optical path or target axis in the device. Instead of the known vertical angle index, in a scanner 1 different influencing parameters which falsify the measured vertical angle occur, which are taken into consideration correspondingly in the calibration method according to the invention.

The vertical angle 31, with reference to the vertical axis and the target or laser axis 3, can in a scanner 1 likewise deviate from the angle measurement direction 3' by the angle 52, but the latter is no longer necessarily a constant over the elevation region owing to the geometry of the beam guidance in a scanner 1. In scanners, in particular in those which do not also move the laser source of the distance measuring unit, this can depend on one or both axis positions. This must be accordingly modeled mathematically and be taken into consideration when determining the direction of the error-containing angle measurement 3' and the calibration parameters.

FIG. 8 shows a collimation error 54 and a trunnion axis tilt 53 of a scanner 1. A trunnion axis tilt 53 and a collimation error 54 (Hz collimation) are known parameters from classical surveying devices using a sighting device, which parameters describe the horizontal deviation of the target axis with respect to an ideal 100 gon angle with respect to the trunnion axis 23.

The illustration again shows the vertical axis 22 and the trunnion axis 23, and the laser target axis 3, which in a plane containing the vertical axis 22, which is symmetrical with respect to the trunnion axis 23, deviates in the horizontal direction from the theoretical predetermined target axis 3' by the collimation error 54. Furthermore illustrated is also a trunnion axis tilt 53 of the error-containing trunnion axis 26 with respect to the trunnion axis 23 which is theoretically orthogonal with respect to the vertical axis 22 using the angle 53.

In practical systems, the errors which are each explained here separately, usually do not occur by themselves but in any combination.

For the scanner 1, a new calibration model matched to the error influences is required for quantitatively describing the vertical axis, trunnion axis, laser axis with respect to the trunnion axis 55, 56 as the fast rotation axis, deflection angles of the rotation mirror with respect to the rotation axis, and possibly further relevant axes, which relate to the relation between the angle sensors and the target axis. Furthermore, the optical axis of the laser beam leaving the instrument is here considered to be the target axis. Any axis offsets, that is to say distances between the axes, primarily act in the near range; at large distances their influence is negligible in a good approximation. It is assumed here that the axis offsets are measured and taken into consideration in the calibration model by the manufacturer, and therefore no field calibration is necessary in this respect.

For the case of an embodiment illustrated by way of example in FIG. 9, in which the laser beam is not observable with the integrated camera, for example on account of the laser wavelength or the geometrical arrangement, alternatively an auxiliary apparatus 17 which can be plugged on externally or integrated for example in the support can be used to measure the two direction angles rc, ri of the laser beam with respect to the support and the currently valid V index. In addition, a positionally sensitive detector (PSD) or a further camera can be plugged on or mounted with second accuracy on the support in order to thereby determine the laser beam direction together with the V angle at the trunnion axis angle sensor. The auxiliary apparatus 17 can in this case be plugged at several locations—at various V angles—onto the device 1. Such a collimator having a PSD sensor can, in the case of a laser spot which is not capturable with the camera, be used to highly accurately determine the beam deviation with respect to the predetermined direction of the theoretical target axis and/or the optical axis of the camera. As an alternative to PSD sensors, which are based on the lateral photoelectric effect, other optical position sensors can also be used to determine the position of a light point, such as for example photodiodes, quadrature photodiodes, CCD/CMOS cameras etc. Using the directions which are defined and known from the auxiliary apparatus 17 which can be plugged on, all parameters of the calibration model—including camera zero point—can be determined uniquely, specifically if the auxiliary apparatus can be mounted at different V angles.

According to the preceding illustration, the axis errors observed with a boresight camera 4 are explained in more detail and with reference to concrete configuration possibilities of the principles according to the invention for calibrating a scanner 1 in the form of an auxiliary hemisphere illustration which is common for this in FIGS. 10*a*, 10*b*, 10*c*, 10*d*. FIGS. 10*a*, 10*b*, 10*c* and 10*d* qualitatively illustrate how the coordinates of the target plate plane correlate to those of the camera.

The field calibration method according to the invention can be implemented in different exemplary embodiments and variants. In the case of target plates 2 with known coordinates, they can be measured in a single scanner setup and in one or two faces. As a first step, the laser orientation rc, ri—for example as already explained previously—can be ascertained with the camera and checked. Subsequently, without using the laser, the parameters such as camera zero point, V index, trunnion axis tilt and mirror tilt can be determined using axis models and adjustment calculation. This possible embodiment of the method is relatively simple to carry out, while rather complex in terms of preparation, since the target plates 2 must be calibrated correspondingly accurately in advance for example using a theodolite.

Another embodiment of the method according to the invention can also carry out a calibration with non-referenced target plates 2. The coordinates of the target plates are in this case not known. A first variant of a calibration according to the invention was already explained with reference to FIG. 5*b*, in which in addition to the directions, image rotations in angular seconds are also surveyed accurately with the camera.

In a further simplified variant of the check process, the directions to the target plates 2 are now measured. It can be shown that with such a process—without the camera survey according to the invention—not all axis parameters are determinable in a single scanner setup—even using a two-face measurement—since the model matrix required in the adjustment calculation surprisingly becomes singular.

In contrast, when using the method according to the invention, this problem does not occur since for example the determination of the axis parameters of laser and rotation axis can be dealt with separately. The axis parameters rc, ri of the laser direction can be ascertained using camera observation of the laser point on the target plate 2 or using an auxiliary means 17 as described in FIG. 9. The mechanical axis parameters such as pci, k and are determined in a two-face measurement using camera aiming toward a number of n target plates. A single setup of the scanner with respect to the target plates is sufficient here.

FIG. 10*a* shows, in a spherical illustration, an ideal axis system with vertical axis 22 and trunnion axis 23 and the central rotation mirror 29, which deflects the field of view of the camera and the laser or target axis 3. The "L" symbol 101 is representative of the local coordinate system of the camera and is illustrated in each case corresponding to the image in the sensor plane of the camera. The two directions of the "L" can also be considered to be representative of possible angle deviations rc, ri of the beam direction of the laser source with respect to the fast rotation or trunnion axis. By means of these angle deflections, the local coordinate system of the camera can also describe possible laser beam deviations. FIG. 10*a* illustrates, with reference to the L symbol, specifically the 100 gon movement of the local camera coordinates at the target of the between horizontal aiming 104 at V=100 gon and zenith aiming 103 at V=0 gon.

FIG. 10*b* illustrates why a two-face measurement at a vertical angle of V=100 gon is unsuitable to determine the parameters of the laser beam direction rc, ri. The camera coordinates 101 and consequently also the laser beam direction from both measurements coincide according to the coordinate axes 115. This is not known from the classical measurement of the collimation error in theodolites, and therefore unexpected for a surveyor. However, at V=50 gon or 350 gon, illustrated by the target axis 3, the orientations of the camera coordinates in a first and second face are rotated with respect to one another by 100 gon, as is visible with reference to the "L" symbols 113 (face 1) and 114 (face 2), and as a result of which rc and ri are determinable—for example according to the method in FIG. 6*b*.

FIG. 10*c* shows in the auxiliary hemisphere an axis system with a trunnion axis error, that is to say an inner rotation axis 22A which is tilted with respect to the vertical axis 22 in a first face, or 22B in a second face. At V=100 gon, the target coordinates on the camera are rotated with respect to one another in the first and second faces, as illustrated by the "L" symbols 117 and 118. With increasing elevation up to V=0 gon (along the arcs illustrated with a dashed line), a translation is added, as is illustrated by the local camera coordinates on the target 127 and 128 with V=50 gon and the local camera coordinates on the target 137 and 138 at V=0 gon.

An angle error of the rotation mirror again has a slightly different effect, which is illustrated in the figure of FIG. 10*d*. The error influence produced by the rotation mirror in the form of a conical error effects an elevation-independent, pure translation of the target position in both faces. This is illustrated by the local camera coordinates on the target 116, 126 and 136 in the first face and by the corresponding coordinates 119, 129, and 139 in the second face (again in each case along elevation arcs drawn in dashed lines).

In a concrete exemplary embodiment, the camera can be recalibrated for example with respect to the existing axis system, in particular with respect to the vertical axis, by the scanner aiming at a target plate at approximately 20 m distance which can be sighted approximately in the horizon. The scanner moves in small steps in the form of a raster or matrix over the target plate. Here, images of the target plates are recorded with the camera to be calibrated. At the same time, the angle sensors of vertical axis and trunnion axis (Hz, V) are read. Subsequently, the control unit determines or surveys the target center points (as an example of a visual feature of the target mark) in pixel units of the local coordinate system of the camera using image processing. The transformation between the angle sensors (gon) and the coordinate system of the camera (pixels) is ascertained using adjustment calculation from this set of data consisting of angle sensor values and associated camera position values. The camera is thus calibrated to angular second accuracy or better. In other words, calibration of the camera is carried out by correlating the angle sensor values with the associated surveying results from the image information. As a result, even geometrical constrains of a reversal measurement which exist owing to the device model can be taken into consideration.

During image evaluation, the position of the image of an edge between two adjacent contrast surfaces of the target mark on the image sensor are interpolated in a known manner, and thus ascertained with subpixel accuracy. Thereby, the position of the edge within the transition pixel can be deduced with reference to the brightness of a transition pixel between two contrast surfaces of a target plate, the achievable position typically being approximately 1/50 pixels.

By way of example, the ideal target direction, which is formed by the normal with respect to the axis cross, which from the vertical axis and trunnion axis, can be defined as the zero point in the camera system. However, since both systems—camera module and laser source—are mounted on the same rotational body (on the vertical axis in the illustrated case), there is a rigid connection between the two. Owing to their spatial stability with respect to one another, the camera zero point can be defined as the error-free laser targeting direction. This type of definition of the camera zero point was already described in FIG. 10a, where the two directions of the "L" symbol are considered representative of possible angle deviations rc, ri of the beam direction of the laser source with respect to the fast rotation or trunnion axis. The preferred zero point of the local coordinate system of the camera here corresponds to the corner of the "L" symbol.

For reasons of technical stability considerations of the device structure, in many cases a calibration of the optical axis of the camera (zero point) with respect to the two rotation axes is not absolutely necessary for each device setup, since their arrangement is usually very stable. The most instable parameters with high sensitivity to the attainable point accuracy are generally the angle deviations of the laser rc, ri, of the trunnion axis k, and of the rotation mirror pci, and the V index i.

For methods according to the invention, the instrument makes available a software program, with which a new determination of the calibration parameters is carried out by the user in the field on the basis of the described method. The user can here choose which of the parameters of the device should be checked and which should be determined again individually using a calibration measuring process.

One exemplary embodiment for error determination will be described below, which is based on a two-face measurement in one setup. The data for checking and determining axis errors of the scanner merely comprise the directions measured with camera support. To this end, the scanner aims its camera onto the target plates which were mounted in advance in the surroundings, typically approximately 1, 2, . . . 8, 10 of them. They are recorded by the camera in each case in two faces, wherein again the angle sensors of vertical and trunnion axis (Hz, V) are read at the same time. It should be taken care here that for appropriately configured observations, the target points should be visible at different sight angles. The specific number of necessary target plates and their recommended setup locations substantially depend on the calibration parameters to be determined.

As a result, the angle coordinates of the geometric center points of all target marks are available for in each case both scanner faces ($Hz_I$, $V_I$) and ($Hz_{II}$, $V_{II}$). The determination of the rotations of the target plates with respect to the target line, described further above, are omitted in this exemplary illustrative, simplest embodiment of the method. If the distance is captured at the same time, the complete Cartesian coordinates, ($x_I$, $y_I$, $z_I$) and ($x_{II}$, $y_{II}$, $z_{II}$), are known or calculatable from the measured polar coordinates.

In a first evaluation step, the device according to the invention having a scan function 1 can be used to ascertain any angle deviations of the laser target axis in the coordinate system of the camera. This is particularly simple for scanners in which camera and laser are orientated in the same direction and the laser spot can be captured by the camera. The turned-on laser in this case is aimed at a target plate and the camera surveys the center point of the laser light spot or laser spot on the target plate in image coordinates. If the wavelength range of the laser is not capturable with the camera, the target plate can be configured, at least at a specifically provided region, for making visible the laser spot for the camera, for example by way of a surface that fluoresces under laser light or the like.

In embodiments of scanners in which laser and camera are incorporated in the respectively opposite sides of the supports and the optical axis of the camera and of the distance measuring unit is deflected by the rotation mirror in respectively different directions, the calibration is slightly more complex. For example, a second-accurate optical deflection means can be utilized in order to render the laser capturable with the camera, or the rotation mirror used on both sides in these instruments can be provided with a certain residual transmissivity for the laser light, such that a portion of the laser radiation is directly incident on the camera and thus the laser point is directly visible.

The remaining axis parameters pci, k and i still to be determined are ascertained in a second step. In order to evaluate the measurement data of a two-face measurement and to again determine the calibration parameters, a plurality of specific methods are known and usable—including from the corresponding literature in the art. The corresponding sets of data for face 1 and face 2 are correlated using difference formation. The constraints owing to the geometric conditions in face 1 and face 2 are here implicitly taken into consideration.

The difference of corresponding object space coordinates or target plate coordinates define the observations L with respect to:

$$3D: (\Delta x, \Delta y, \Delta z) = L3D$$

$$2D: (\Delta Hz, \Delta V) = L2D$$

wherein Hz=azimth, V=vertical angle, with the differences:

$$3D: \Delta x_k = x_{II_k} - x_{I_k}$$

$$\Delta y_k = y_{II_k} - y_{I_k}$$

$$\Delta z_k = z_{II_k} - z_{I_k}$$

$$2D: \Delta Hz_k = Hz_{II_k} - 200 - Hz_{I_k}$$

$$\Delta V_k = 400 - V_{II_k} - V_{I_k}$$

The representation of the object in polar coordinates is referred to as "2D", that in the Cartesian space as "3D".

The calibration parameters and the measurement data are combined in a functional model F as the initial face for mathematical parameter estimation for example in the form of F(L,X)=0, wherein L stands for the measurement variables (observations) and X for the required parameters. According to the teaching of the adjustment calculation, a new parameter set X is found using optimization methods, in which F is minimally required. The engineering survey often uses adjustment calculation according to Gauss-Markov or the more general models according to Gauss-Helmert. In addition, the equation system F is linearized, which results in a model matrix A (Jacobi matrix) and a normal equation matrix N. The mathematical expression in this case is $$L+v=A*X.$$

In this case:
X=vector of the unknown parameter;
A=design or model matrix with measurement values, this is produced by derivation of the functional relationship for the parameters X;
L=observations, measurement values;
V=residuals (also referred to as improvements).

Demand for minimization of the weighted residual sums of squares on the measured observations results in an equation system of the unknown parameters. The new determined calibration parameters, for example the trunnion axis error k, the mirror error pci and the V index i are the result of the new equation system. The remaining differences between modeled and measured variables are referred to as residuals.

The residuals give an indication of the measurement accuracy achieved. Alternatively, the indication of the measurement accuracy can also be matched to the work surroundings of the user. Other, for example statistical, accuracy indications such as the standard deviation of the total angle are therefore likewise determinable and displayable on the user interface.

For accuracy determination, an a-posteriori variance of the new residuals is calculated. The following standard deviation is referred to as a global test:

$$\sqrt{\frac{\sum_k (residuals_k)^2}{K-u}} = \text{variance of the unit weight}$$

wherein k=number of measurements, u=number of constraints.

With an optional, additional calculation step, the covariances of the estimated parameters are then also available.

Instead of, as described above, comparing the pairs from measurements in two faces directly, all observations can also be combined in a matrix A independently of one another. The restrictions or additional requirements of a two-face measurement, which are provided for example constructively or geometrically, can then be included as condition equations, what is referred to as constraints, in the adjustment problem. The constraints result for example in:

$$Hz_{II}-Hz_I=200 \text{ gon}$$

$$V_{II}+V_I=400 \text{ gon}$$

The Gauss-Helmert method or the total least square method can also be used, for example, in this case as the solution method. The constraints are here incorporated using Lagrange multipliers into the equation system of the adjustment calculation. It is clear to a person skilled in the art that in addition to the weighted quadratic adjustment method other estimation functions are also possible for deriving system parameters.

On the basis of the calibration parameters ascertained according to the invention, in subsequent measurements corrections of the measurement values can be carried out online or off-line. It is also possible on the basis of the statistical characteristic values, from the accuracy check according to the invention, to make statements relating to the accuracy of the measurement results to be expected of a specific measurement, which in practice is often helpful or even necessary, especially in measurement devices and measurement methods which have recently been introduced into this field and are still uncommon.

Figure 11:
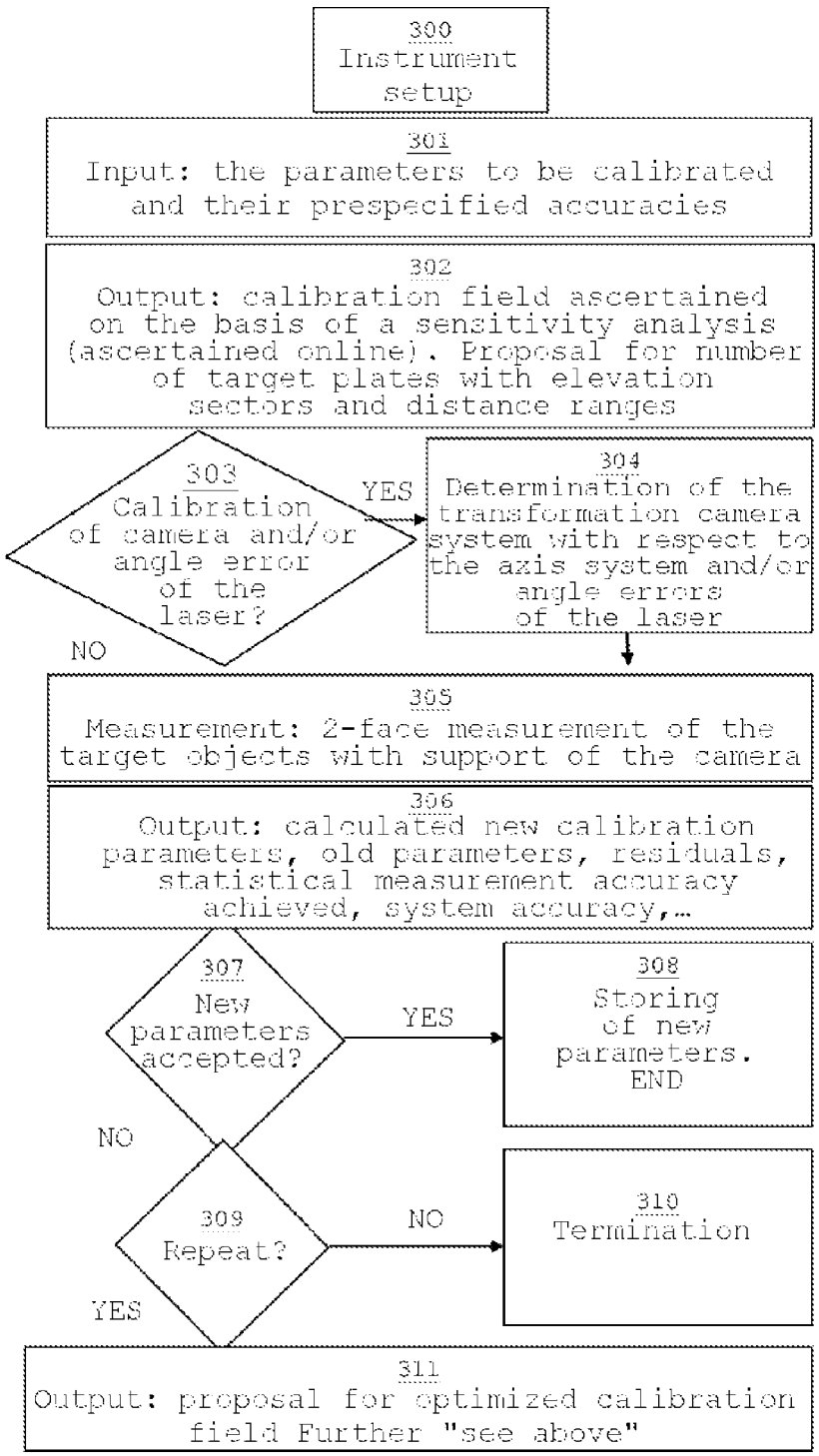
FIG. 11 shows a flowchart of the process of an exemplary check and calibration process.

FIG. 11 shows a flowchart of an exemplary progress sequence of the check and/or calibration method according to the invention, which is made available in particular in the form of an interactive user guidance for the user of the device software using a a user interface. Here, the reference numerals indicate the following:

300: Instrument setup;
301: Input: the parameters to be calibrated and their pre-specified accuracies;
302: Output: calibration field ascertained on the basis of a sensitivity analysis (ascertained online). Proposal for number of target plates with elevation sectors and distance ranges;
303: Selection: calibration of camera and/or angle error of the laser? (YES/NO);
304: Determination of the transformation camera system with respect to the axis system and/or angle errors of the laser;
305: Measurement: 2-face measurement of the target objects with support of the camera;
306: Output: calculated new calibration parameters, old parameters, residuals, statistical measurement accuracy achieved, system accuracy, . . . ;
307: Selection: new parameters accepted? (YES/NO);
308: Storing of new parameters. END;
309: Selection: repeat? (YES/NO);
310: Termination;
311: Output: proposal for optimized calibration field: further "see above."

In detail, in a first step 300, the setup of the device is carried out as has already been described.

Subsequently, in step 301, the user can input the parameters to be calibrated or to be checked and/or the associated prespecified accuracies, or select them from a number of prespecified sets of data. Optionally, the number of setups intended for checking can be input into the instrument.

Next, the device in step 302 determines a calibration field on the basis of a sensitivity analysis ascertained especially online and proposes a number of target plates to be set up and their elevation sectors and distance ranges to the user, or the user can propose site-dependent, alternative target plate setup locations, which are verified by the device as to their usefulness for calibration.

Sensitivity analysis in this case refers to a process which—in simplified terms—verifies that a model matrix (or referred to as cofactor matrix) of the device model with the measurement values ascertained in the calibration process is not poorly conditioned or even becomes singular, which is counter-productive for an accurate determination of the angle parameters and could lead to a potentially high standard deviation. Not only the sensitivity of the calibration parameters to be ascertained with respect to the proposed or selected target plate setups are analyzed, but also their correlations with respect to one another. According to the sensitivity analysis, preferred or unsuitable spatial configurations of the target plates can thus be assessed and it can thus be ensured that the calibration process can meet the prespecified accuracy requirements.

The user can now optionally start the step 304 of the camera calibration with the selection 303, although step 304, as described, does not necessarily have to be carried out in many cases for each calibration process. Step 304, in which the camera or the laser target line is calibrated, can for example be skipped.

Next, in step 305, the actual survey of the previously set-up or selected target plates or target objects is carried out in each case in two faces, that is to say in those two alignments of the two device axes in which (in the error-free case) the same target point is measured. Here, any errors are identified and determined by evaluating the camera images using image processing software. From the deviations which are identified and determined using camera and angle measurement device of the axes, subsequently the device accuracy also becomes determinable.

In step 306, new calibration parameters, improvements, statistical characteristic values (such as achieved statistical measurement accuracy, system accuracy, etc.) can now be calculated, comparisons with the old calibration parameters can be determined, and a large amount of further information can be determined and, if appropriate, also displayed in numerical or graphical form for the user.

The calibration parameters and accuracy specifications ascertained can be verified by the user in connection with the selection 307 and, if appropriate, accepted and stored for the subsequent measurements in step 308. If the ascertained calibration parameters do not meet the necessary accuracy requirements, the values of which indicate insufficiencies relating to the calibration process (for example shocks, non-optimum choice of setups of the target plates, unstable setup of the device or of the target plates, unfavorable light conditions or other disturbing influences), or such calibration parameters are identified by the device software, the selection 309 can be used to repeat the check and calibration process or the calibration process can be interrupted with step 310.

A repetition in step 311 can in that case be carried out, if appropriate, with a correspondingly optimized calibration field starting at step 302, to which end the device software can make corresponding proposals to the user. Alternatively, merely the measurement in step 305 may be repeated. The ascertained accuracy and calibration information can be subsequently stored in the measurement operation of the device as additional information together with the determined measurement data and be correspondingly taken into account in their evaluation.

Figure 12:
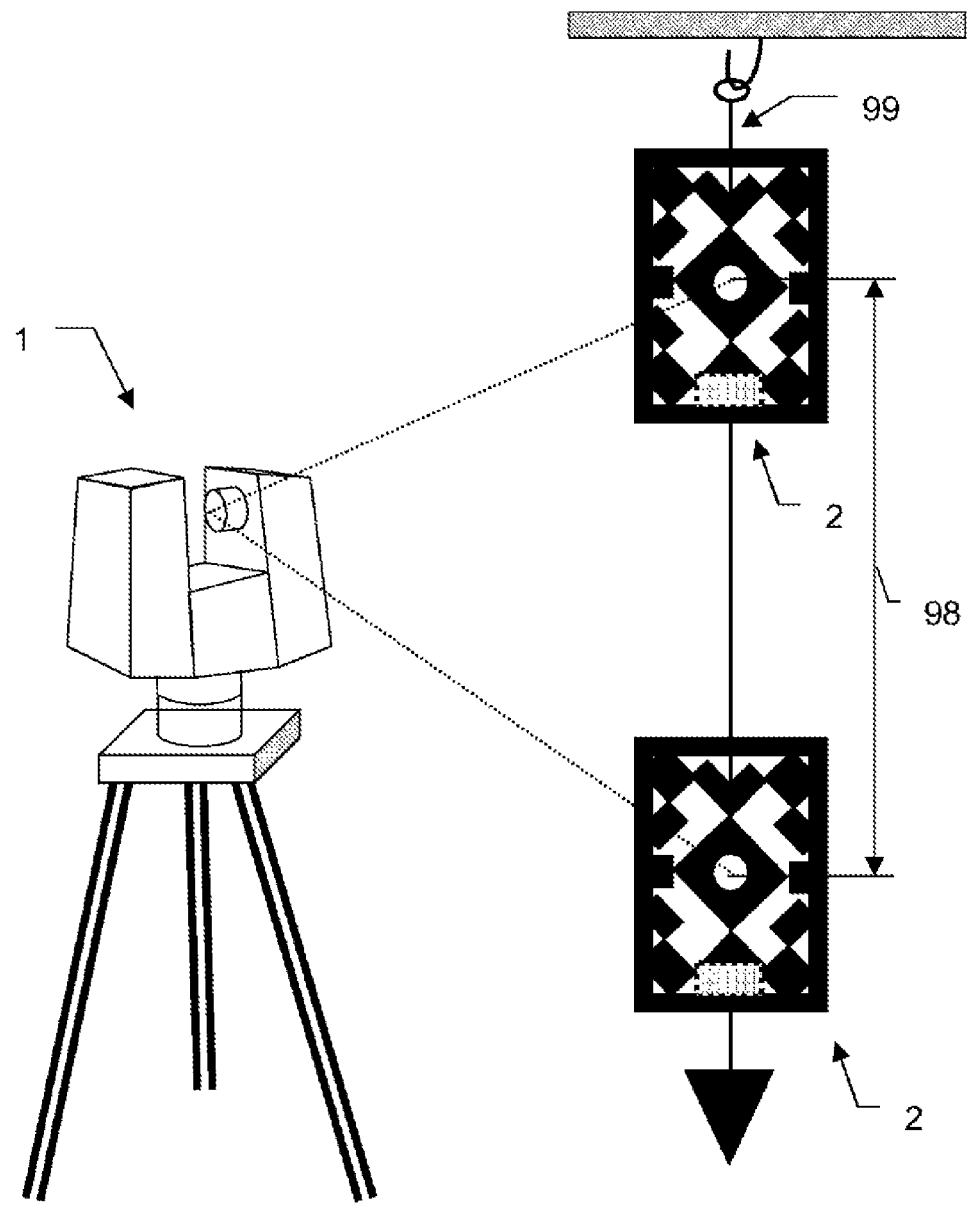
FIG. 12 shows a further exemplary embodiment of a calibration target according to the invention.

In one exemplary embodiment, as that in FIG. 12, the calibration target can be configured with at least two target plates, which are configured and arranged such that, during their setup, they arrange themselves owing to gravity such that they are perpendicular one above the other with a defined distance. By way of example, such a calibration target can be configured with two target plates 2 with contrast surfaces which are detectable by the camera and which are arranged at a defined distance 98 with respect to one another at a plummet line 99 or a plumb line. The two target plates of the calibration target can in this case also be configured on a common carrier, for example as an elongate plate, which has a contrast surface pattern at the top and bottom at a known distance from one another, and which contrast surface pattern is surveyable by the camera, and which under the influence of gravity orients itself to be perpendicular or is set up by the user to be perpendicular. Alternatively, an arrangement of two target plates having a known distance from one another, which is self-leveling or can be leveled using a level or gravitation sensor, can also be used. In an arbitrary spatial setup of the device 1 and of the calibration target relative to one another, a calibration in a single device and calibration-target setup can here be carried out by way of surveying the calibration plates 2 using the camera in two faces and determining the distance between the device 1 and the target plates 2.

In order to calculate the calibration parameters, it can be assumed here that the vertical axis of the device is perpendicular, that is to say parallel with respect to the perpendicular arrangement of the target plates 2. On the basis of the measurement data together with the known vertical distance 98 between the two target plates 2, a triangle (target plate A—scanner—target plate B) is produced here, by means of which (for example by way of an adjustment calculation) all angle parameters of the axis system can be determined, without obtaining a singular equation system in the process. The setup of the calibration targets with respect to the device does not have to be known in advance in this case and can, for example, be selected in a manner in which it is matched to the prevailing local conditions, prior to a measurement in the field, that is to say in that device setup in which the measurement is also subsequently carried out.

What is claimed is:

1. A field calibration method for a 3D scanner device having a scan function, the 3D scanner device including:
   an electro-optical distance measuring device with a laser axis as the target axis;
   a motorized optical deflection unit, which independently deflects the target axis by a variable deflection angle about a fast axis with respect to the distance measuring device; and
   an angle measurement device for determining an angular position of the deflection unit, the method comprising the following steps:
   a first survey of angle coordinates of a target mark in a first angular position of the deflection unit as the first face; and
   a second survey of angle coordinates of the target mark in a second angular position of the deflection unit as the second face;
   the first face and second face differ; and
   wherein the first and second surveys are carried out using images, which is carried out with a camera, the optical axis of which is deflected by the deflection unit with respect to the camera, and
   wherein a determination of calibration parameters is carried out on the basis of the angular positions and the angle coordinates in the first and second faces using an adjustment calculation.

2. The method as claimed in claim 1, wherein the field calibration for the device is carried out by measuring in polar coordinates, the target axis is deflected by a mirror which is movable with respect to the distance measuring device, and the first face is rotated relative to the second face in two axes such that the target axis in both faces points at least approximately in the same spatial direction.

3. The method as claimed in claim 1, wherein the first and second surveys of the target mark are carried out using digital image processing in image coordinates of the camera.

4. The method as claimed in claim 3, wherein the survey is carried out by way of a determination of a direction to the target mark and/or a rotation of the target mark on the basis of the image coordinates both in the first and second faces.

5. The method as claimed in claim 3, wherein the survey is carried out with a resolution of the image coordinates of the target mark with a resolution of less than 5 angular seconds with a subpixel resolution of the images.

6. The method as claimed in claim 3, wherein the survey is carried out with a resolution of the image coordinates of the target mark with a resolution of less than 1 angular second with a subpixel resolution of the images.

7. The method as claimed in claim 1, wherein the survey is carried out by comparing and matching at least one visual feature of the target marks in the images from the first and second faces with a subpixel resolution of the visual feature in the images.

8. The method as claimed in claim 1, wherein the calibration parameters are ascertained on the basis of a mathematical device model, which represents the mechanical setup and the beam guidance of the device, the mathematical device model having, as one of the calibration parameters, a direction angle deviation of the non-deflected laser axis with respect to a rotation axis of the deflection unit.

9. The method as claimed in claim 1, additionally including:
a distance calibration of the distance measuring device using a reference section integrated in the device in the distance measuring device;
a measurement of a distance from the target mark using the distance-calibrated distance measuring device in the first and in the second face; and
an incorporation of these distances during the ascertainment of the calibration parameters.

10. The method as claimed in claim 1, additionally including a calibration of the target axis in image coordinates of the camera by way of ascertaining a point of incidence of the laser axis on the target mark using the camera.

11. The method as claimed in claim 1, additionally including the determination of the calibration parameters of the device having a scan function in its field setup on the basis of a plurality of target marks and surveying the same in each case in the first and second face, wherein the calibration method can be carried out, without re-stationing, in a single field setup of the device with unknown position of the target mark, and wherein the target marks can be seen under in each case different sight angles, wherein the target marks are applied to 2 to 10 target plates, which are set up in different positions with respect to the device having a scan function.

12. The method as claimed in claim 1, additionally including an ascertainment and display of a recommended setup region of the target marks by the device, according to the ascertained calibration parameters and on the basis of the device model.

13. A 3D scanner device for spatially surveying an object in the form of a point cloud, the 3D scanner being configured to measure in polar coordinates, the 3D scanner device comprising:
an electro-optical distance measuring device for ascertaining a distance in the direction of a target axis;
a motorized deflection unit for the variable angular independent deflection of the target axis with respect to the distance measuring device, having at least one mirror which is movable about a fast axis by way of a motor relative to the target axis;
a measurement device for ascertaining the angular deflection of the deflection unit;
a control unit for the at least partially automated execution of surveying tasks having a local or spatially separate user interface;
wherein the deflection unit deflects an optical axis of a camera with respect to the camera, and the camera and the control unit are configured such that the angle deflection of the 3D scanner is calibratable in the field on the basis of images of at least one target mark, captured by the camera in a plurality of different angle deflections, in each case in a first face of the deflection unit and in a second face, which is rotated in two axes with respect to the first face such that the target axis in both faces at least approximately points in the same spatial direction.

14. The device as claimed in claim 13, wherein an angle measurement accuracy in the captured images of better than 5 angular seconds is achievable using the camera and control unit.

15. The device as claimed in claim 13, wherein an angle measurement accuracy in the captured images of better than 1 angular second is achievable using the camera and control unit.

16. The device as claimed in claim 13, additionally including an add-on collimator, which is configured such that the target axis of the distance measuring device, which target axis which cannot be captured by the camera, is surveyable in its angular position.

17. The device as claimed in claim 13, wherein the control unit is configured such that a visual feature of the target marks is surveyable on the basis of the images of the target marks, which are captured in a plurality of angular positions by the camera, by numerical image processing, wherein the measurement unit is calibratable on the basis of surveys using geometrical image transformations, which bring the visual feature in the images from a first and a second angular position into coincidence.

18. A calibration target for calibrating a 3D scanner, with a method as claimed in claim 1, wherein the calibration target has at least two planar calibration target plates, comprising:
a visual feature with at least two adjoining contrast surfaces, which are imaged by alternately bright and dark surface regions;
a laser reflection region having a retroreflective surface; and
a code region having a graphical coding for identification of the target plate, which can be read out optically using a camera,
wherein the at least two calibration target plates are configured and arranged such that they orientate themselves owing to gravity such that they are perpendicular one above the other with a known distance to one another, wherein the calibration target plates to this end are attached to a plumb.

19. A non-transitory, tangible computer program product with program code, which is stored on a non-transitory machine-readable medium, wherein the non-transitory machine-readable medium performs the method as claimed in claim 1 when executed on a computer.

20. The device as claimed in claim 16, wherein the add-on collimator is embodied as a collimator with a PSD or optical position sensor for surveying the target axis in a plurality of angular positions.

21. The method as claimed in claim 1, wherein the first and the second angular position of the deflection unit differ.

* * * * *